United States Patent
Stathakis et al.

(10) Patent No.: US 11,044,125 B2
(45) Date of Patent: Jun. 22, 2021

(54) NODES AND METHODS THEREIN FOR IMPROVING MULTI-USER TRANSMISSIONS IN A WIRELESS COMMUNICATIONS NETWORK

(71) Applicant: Telefonaktiebolaget LM Ericsson (publ), Stockholm (SE)

(72) Inventors: Efthymios Stathakis, Stockholm (SE); Stéphane Tessier, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/645,222

(22) PCT Filed: Oct. 10, 2017

(86) PCT No.: PCT/SE2017/050991
§ 371 (c)(1),
(2) Date: Mar. 6, 2020

(87) PCT Pub. No.: WO2019/074408
PCT Pub. Date: Apr. 18, 2019

(65) Prior Publication Data
US 2020/0287754 A1 Sep. 10, 2020

(51) Int. Cl.
*H03H 7/40* (2006.01)
*H04L 25/03* (2006.01)
(Continued)

(52) U.S. Cl.
CPC ..... *H04L 25/03343* (2013.01); *H04B 7/0452* (2013.01); *H04L 25/0204* (2013.01)

(58) Field of Classification Search
CPC ............ H04L 25/03019; H04B 7/0617; H04B 7/0413; H04W 4/06; H04W 72/044
(Continued)

(56) References Cited

U.S. PATENT DOCUMENTS

2011/0075745 A1 3/2011 Kleider et al.
2013/0148590 A1 6/2013 Hu et al.
(Continued)

FOREIGN PATENT DOCUMENTS

WO 2009064108 A2 5/2009
WO 2015073488 A1 5/2015

OTHER PUBLICATIONS

International Registration and Written Opinion dated Sep. 10, 2018 for International Application No. PCT/SE2017/050991 filed on Oct. 10, 2017, consisting of 9-pages.
(Continued)

*Primary Examiner* — Khai Tran
(74) *Attorney, Agent, or Firm* — Christopher & Weisberg, P.A.

(57) ABSTRACT

A method performed by a node in a wireless communications network for improving multi-user transmissions in the wireless communications network is provided. The node determines channel estimates based on demodulation reference signals, or a data symbol in at least one Physical Resource Block, PRB, of the latest received subframe. Then, the node determines a phase difference and an amplitude difference between Resource Elements, REs, in a first set of contiguous REs in the at least one PRB of the latest received subframe based on the obtained channel estimates. The node then pre-equalizes at least one channel within at least one PRB of a transmission subframe by aligning the phase and amplitude of REs in a second set of contiguous REs therein based on the determined phase and amplitude differences. A node for improving multi-user transmissions in the wireless communications network is also provided.

20 Claims, 12 Drawing Sheets

(51) Int. Cl.
  *H04B 7/0452* (2017.01)
  *H04L 25/02* (2006.01)
(58) Field of Classification Search
  USPC .......................... 375/230, 229; 708/322, 323
  See application file for complete search history.

(56) References Cited

U.S. PATENT DOCUMENTS

| | | | |
|---|---|---|---|
| 2014/0255029 A1* | 9/2014 | Varanese | H04L 5/0048 398/66 |
| 2016/0204822 A1 | 7/2016 | Yu et al. | |
| 2018/0048349 A1* | 2/2018 | Sun | H04W 72/0466 |
| 2019/0013851 A1* | 1/2019 | Su | H04B 7/0617 |

OTHER PUBLICATIONS

3GPP TR 25.814 V7.1.0; 3rd Generation Partnership Project; Technical Specification Group Radio Access Network; Physical layer aspects for evolved Universal Terrestrial Radio Access (UTRA) (Release 7); Sep. 2006, consisting of 132-pages.

Dai, Linglong et al.; "Non-Orthogonal Multiple Access for 5G: Solutions, Challenges, Opportunities, and Future Research Trends" Software Defined 5G Networks for Anything as a Service, pp. 76-81, IEEE Communications Magazine, Sep. 2015, consisting of 8-pages.

Zhou, Meili et al. "DCT-Based Channel Estimation Techniques for LTE Uplink", National Mobile Communications Research Laboratory Southeast University, Nanjing 210096, P. R. China, pp. 1034-1038, 2009, consisting of 5-pages.

European Search Report dated Apr. 21, 2021 for Application No. 17928512.7, consisting of 6-pages.

Witrisal et al. "Pre-equalization for the Up-link of TDD OFDM Systems" Centre for Wireless Personal Communications (CEWPC), IRCTR; Access Network Laboratory, Korea Telecom, Seoul, Korea, 2001, consisting of 6-pages.

3GPP TSG RAN WG1 Meeting #87 R1-1612610; Title: Harmonized Reference Signal Structure for Phase Noise & Reciprocity; Agenda Item: 7.1.3.2; Source: National Instruments; Document for: Discussion and Decision; Location and Date: Reno, USA, Nov. 14-18, 2016, consisting of 9-pages.

\* cited by examiner

NODES AND METHODS THEREIN FOR IMPROVING MULTI-USER TRANSMISSIONS IN A WIRELESS COMMUNICATIONS NETWORK

CROSS-REFERENCE TO RELATED APPLICATION

This application is a Submission Under 35 U.S.C. § 371 for U.S. National Stage Patent Application of International Application Number: PCT/SE2017/050991, filed Oct. 10, 2017 entitled "NODES AND METHODS THEREIN FOR IMPROVING MULTI-USER TRANSMISSIONS IN A WIRELESS COMMUNICATIONS NETWORK," the entirety of which is incorporated herein by reference.

TECHNICAL FIELD

Embodiments herein relate to multi-user transmissions in a wireless communications network. In particular, embodiments herein relate to nodes and methods therein for improving multi-user transmissions in a wireless communications network.

BACKGROUND

In today's wireless communications networks a number of different technologies are used, such as New Radio (NR), Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for wireless communication. A wireless communications network comprises radio base stations providing radio coverage over at least one respective geographical area forming a cell. The cell definition may also incorporate frequency bands used for transmissions, which means that two different cells may cover the same geographical area but using different frequency bands. Wireless devices, also referred to herein as User Equipments, UEs, mobile stations, and/or wireless terminals, are served in the cells by the respective radio base station and are communicating with respective radio base station. The wireless devices transmit data over an air or radio interface to the radio base stations in uplink, UL, transmissions and the radio base stations transmit data over an air or radio interface to the wireless devices in downlink, DL, transmissions.

LTE is a Frequency Division Multiplexing technology, wherein Orthogonal Frequency Division Multiplexing (OFDM) is used in a DL transmission from a radio base station to a wireless device. Single Carrier-Frequency Domain Multiple Access (SC-FDMA) is used in an UL transmission from the wireless device to the radio base station. Services in LTE are supported in the packet switched domain. The SC-FDMA used in the UL may also be referred to as Discrete Fourier Transform Spread (DFTS)-OFDM.

The basic LTE downlink physical resource may thus be seen as a time-frequency grid as illustrated in FIG. 1, where each Resource Element (RE) corresponds to one OFDM subcarrier during one OFDM symbol interval. A symbol interval comprises a cyclic prefix (cp), which cp is a prefixing of a symbol with a repetition of the end of the symbol to act as a guard band between symbols and/or facilitate frequency domain processing. Frequencies f or subcarriers having a subcarrier spacing $\Delta f$ are defined along a z-axis and symbols are defined along an x-axis. The uplink subframe has the same subcarrier spacing as the downlink and the same number of SC-FDMA symbols in the time domain as OFDM symbols in the downlink.

In the time domain, LTE downlink transmissions are organized into radio frames of 10 ms, each radio frame comprising ten equally-sized subframes, #0-#9, each with a Tsubframe=1 ms of length in time as shown in FIG. 2. Furthermore, the resource allocation in LTE is typically described in terms of resource blocks, where a resource block corresponds to one slot of 0.5 ms in the time domain and 12 subcarriers in the frequency domain. Resource blocks are numbered in the frequency domain, starting with resource block 0 from one end of the system bandwidth. A pair of two adjacent resource blocks in time direction, e.g. 1.0 ms, is known as a resource block pair. For normal cyclic prefix, one subframe may consist of 14 OFDM symbols. The duration of each symbol may be approximately 71.4 µs.

Downlink transmissions are dynamically scheduled, i.e., in each subframe the base station transmits control information about which wireless devices data is transmitted to and upon which resource blocks the data is transmitted, in the current downlink subframe. This control signalling is typically transmitted in the first 1, 2, or 3 OFDM symbols in each subframe and the number n=1, 2, or 3 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3. The reference symbols shown in the above FIG. 3 are the cell specific reference symbols (CRS) and are used to support multiple functions including fine time and frequency synchronization and channel estimation for certain transmission modes.

Uplink transmissions are dynamically scheduled, i.e., in each downlink subframe the base station transmits control information about which wireless devices should transmit data to the radio base station, e.g. an eNodeB, in subsequent subframes, and upon which resource blocks the data is transmitted. The uplink resource grid is comprised of data and uplink control information in the Physical Uplink Shared Channel, PUSCH, uplink control information in the Physical Uplink Control Channel, PUCCH, and various reference signals such as demodulation reference signals, e.g. DMRS, and sounding reference signals, SRS. DMRS are used for coherent demodulation of PUSCH and PUCCH data, whereas SRS is not associated with any data or control information but is generally used to estimate the uplink channel quality for purposes of frequency-selective scheduling. An example uplink subframe is shown in FIG. 4. Note that UL DMRS and SRS are time-multiplexed into the UL subframe, and SRS are normally always transmitted in the last symbol of a normal UL subframe. The PUSCH DMRS is transmitted once every slot for subframes with normal cyclic prefix, and may be located in the fourth and eleventh SC-FDMA symbols.

When it comes to multi-user transmission, it is in practice already included in LTE release 8, wherein the concept of Multi-User MIMO, MU-MIMO, for the uplink was introduced. The idea with multi-user transmission is to achieve a better performance as compared to orthogonal transmission by properly designing overlapping transmissions. The fact that this may be achieved is well-documented in literature. The gains are higher in scenarios where wireless devices do not act unilaterally, but instead coordinate in ways that are beneficial for the wireless communications network as a whole.

In NR, the concept of multi-user transmission is considered to further be extended to Non-Orthogonal Multiple Access, NOMA. Using NOMA, the wireless devices may perform some type of precoding and spread their signals in frequency using spreading vectors, i.e. having channel dispersion in frequency. In this case, since the task of a radio base station is to successfully separate and decode the streams of interest by means of a multi-user detector, the radio base stations may exploit the underlying structure in the superimposed arriving signals in order to enhance the multi-user detection and demodulation performance.

However, when multiple transmissions occupy the same time/frequency resources, a critical task for successfully decoding the data is to estimate the channel that corresponds to each of the overlapping layers. In comparison to a single layer transmission, this task is more complicated because of pilot signal contamination; that is, pilot signals, such as, for example, demodulation reference signals, e.g. DMRS sequences, will be interfering with each other and thereby render the channel estimation more difficult. This is especially true in combination with the channel dispersion in frequency as explained above.

Hence, in order to perform multi-user channel estimation, DMRS sequences needs to be properly chosen such that they are tailored to time- and/or frequency-based channel estimation. One way to separate the channels of the wireless device is to use Orthogonal Cover Codes, OCCs. However, the use of OCCs is limited by the channel dispersion. This is because, since the channel is not flat, the orthogonality of the OCCs is impaired. This means that the higher the channel dispersion, the more frequency selective the channel will become and the more difficult ii will be to mitigate the pilot signal contamination. The more DMRS sequences are overlaid or overlapping, the more pronounced the pilot signal contamination will be.

A way to help alleviate this problem and partially decrease the interference among the DMRS sequences is to use a comb-like structure. In this case, the DMRS sequences are multiplexed into non-overlapping REs. This means, however, that the more wireless devices that are multiplexed, the further away the pilot signals will be placed in frequency and less information will be available for recovering the channel in the missing positions.

To further enhance the channel estimation, cyclic shifts may be used. This means employing phase-shifts of a base sequence, such as, e.g. a Zadoff-Chu sequence that is used in LTE, in frequency that helps in separating the channel in a transform domain, such as, e.g. a time domain obtained via an Inverse Fast Fourier Transform or Discrete Cosine Transform domain. However, this approach requires sufficiently long DMRS sequences, and hence many PRBs, in order to acquire a good resolution for the separation in the transform domain. Also, this approach is not very effective for channels that have a high delay spread.

Hence, there is a need to improve channel estimation for multi-user transmissions in a wireless communications network.

SUMMARY

It is an object of embodiments herein to improve channel estimation for multi-user transmissions in a wireless communications network.

According to a first aspect of embodiments herein, the object is achieved by a method performed by a node in a wireless communications network for improving multi-user transmissions in the wireless communications network. The node determines channel estimates based on demodulation reference signals, or a data symbol in at least one Physical Resource Block, PRB, of the latest received subframe. Also, the node determines a phase difference and an amplitude difference between Resource Elements, REs, in a first set of contiguous REs in the at least one PRB of the latest received subframe based on the obtained channel estimates. Further, the node pre-equalizes at least one channel within at least one PRB of a transmission subframe by aligning the phase and amplitude of REs in a second set of contiguous REs therein based on the determined phase and amplitude differences.

According to a second aspect of embodiments herein, the object is achieved by node in a wireless communications network for improving multi-user transmissions in the wireless communications network. The node is configured to determine channel estimates based on demodulation reference signals, or a data symbol in at least one Physical Resource Block, PRB, of the latest received subframe. The node is also configured to determine a phase difference and an amplitude difference between Resource Elements, REs, in a first set of contiguous REs in the at least one PRB of the latest received subframe based on the obtained channel estimates. The node is further configured to pre-equalize at least one channel within at least one PRB of a transmission subframe by aligning the phase and amplitude of REs in a second set of contiguous REs therein based on the determined phase and amplitude differences.

According to a third aspect of the embodiments herein, a computer program is also provided configured to perform the method described above, as well as, a computer program product. Further, according to a fourth aspect of the embodiments herein, carriers are also provided configured to carry the computer program configured for performing the method described above.

By using the phase and amplitude differences between REs in PRBs of the latest received subframe in order to pre-equalize, or "flatten", a channel locally in PRBs of an upcoming subframe to be transmitted, a receiver of multi-user transmissions which receives such transmitted subframes from, e.g. the same or different transmitters, is able to more easily separate different channel estimates and data, and mitigate the pilot signal contamination upon receiving the multi-user transmissions. This will enhance the channel estimation at the receiver for multi-user transmissions and thus improve the performance of multi-user transmissions in the wireless communications network.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
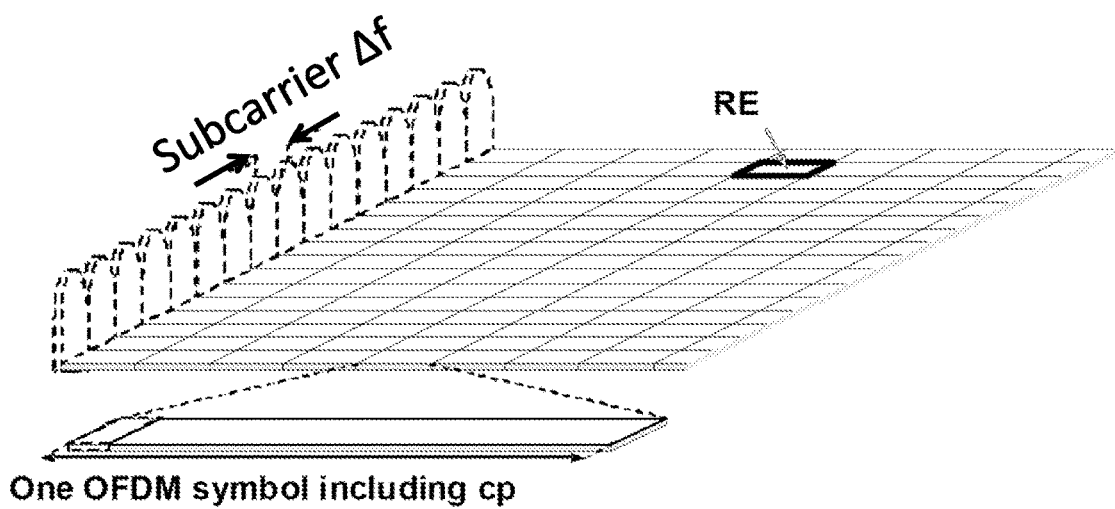
FIG. 1 is a schematic block diagram of a LTE downlink physical resource.
Figure 2:
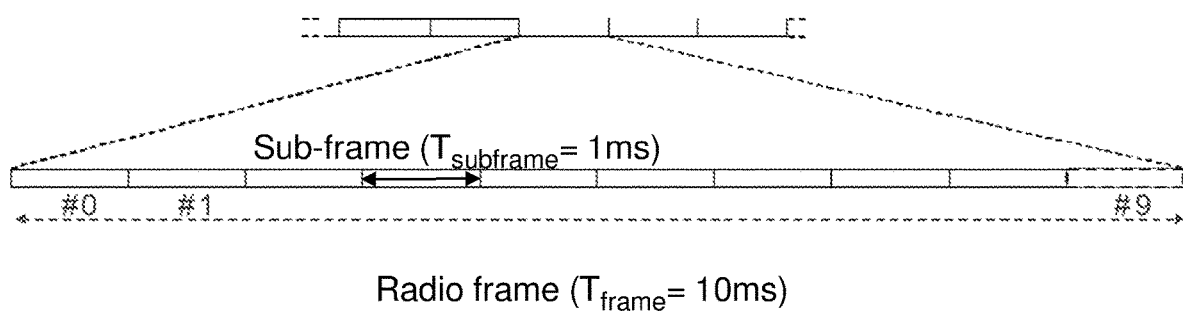
FIG. 2 is a schematic overview depicting radio frames.
Figure 3:
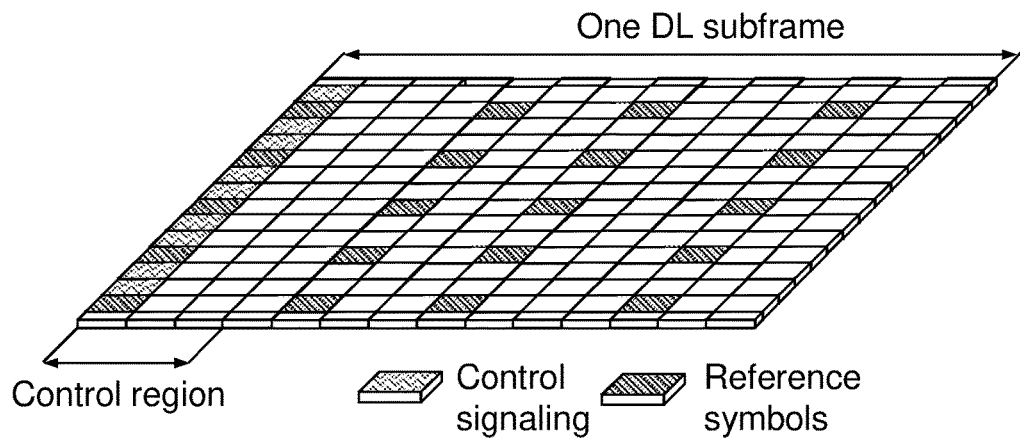
FIG. 3 is a schematic overview depicting a DL subframe.
Figure 4:
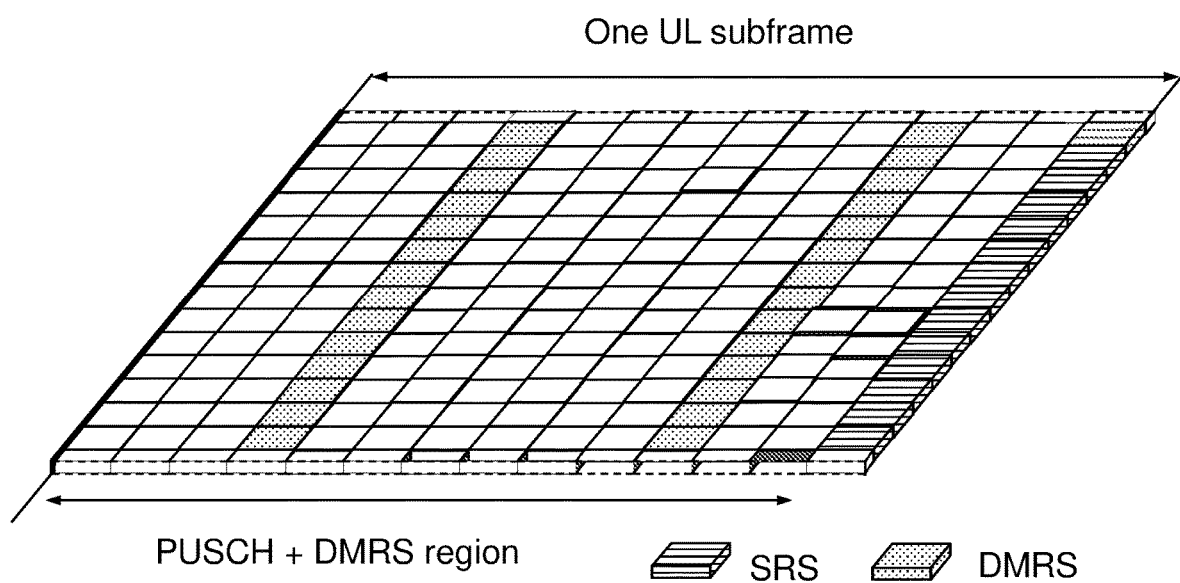
FIG. 4 is a schematic overview depicting a UL subframe.

The figures are schematic and simplified for clarity, and they merely show details which are essential to the understanding of the embodiments presented herein, while other details have been left out. Throughout, the same reference numerals are used for identical or corresponding parts or steps.

Figure 5:
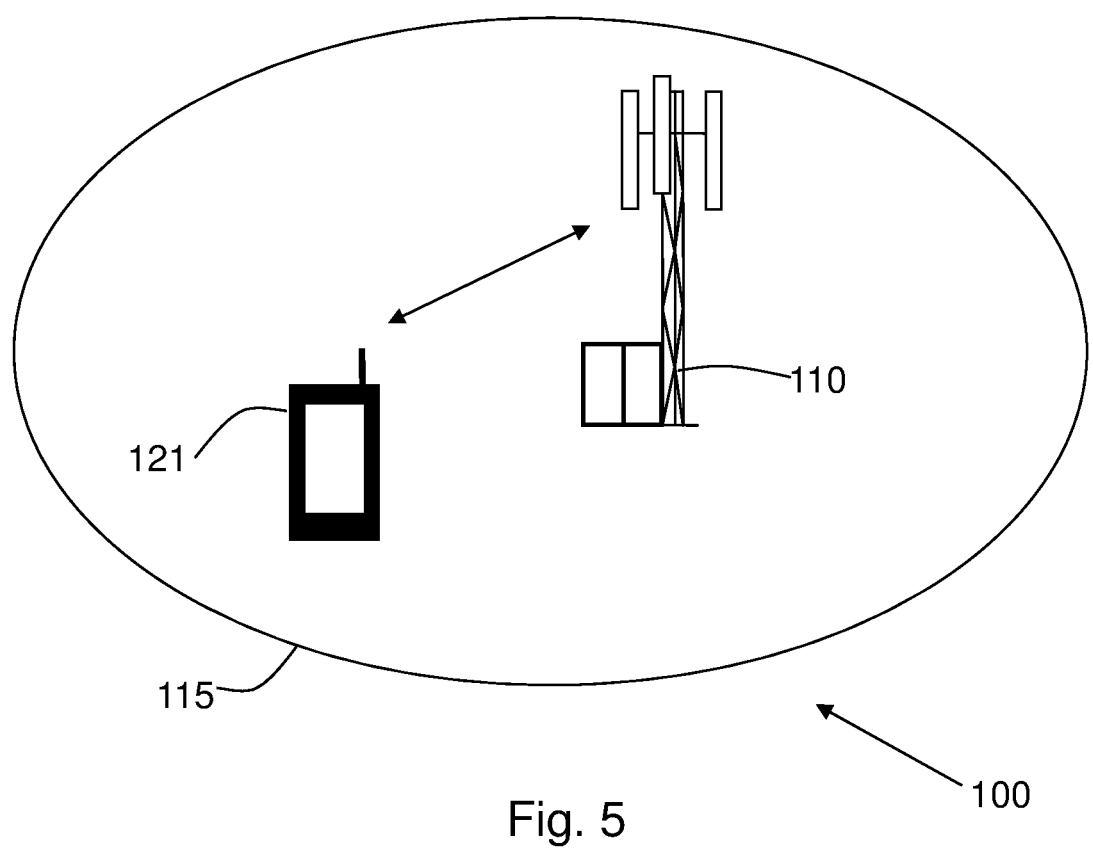
FIG. 5 is a schematic block diagram illustrating embodiments of nodes in a wireless communications network.

FIG. 5 depicts a wireless communications network 100 in which embodiments herein may operate. In some embodiments, the wireless communications network 100 may be a radio communications network, such as, New Radio (NR) network. Although, the wireless communications network 100 is exemplified herein as an NR network, the wireless communications network 100 may also employ technology of any one of Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM, or any other similar network or system. The wireless communications network 100 may also be an Ultra Dense Network, UDN, which e.g. may transmit on millimetre-waves (mmW).

The wireless communications network 100 comprises a network node 110. The network node 110 serves at least one cell 115. The network node 110 may correspond to any type of network node or radio network node capable of communicating with a wireless device and/or with another network node, such as, e.g. be a base station, a radio base station, gNB, eNB, eNodeB, a Home Node B, a Home eNode B, femto Base Station (BS), pico BS, etc., in the wireless communications network 100. Further examples of the network node 110 may also be e.g. repeater, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), core network node (e.g. MSC, MME, etc.), O&M, OSS, SON, positioning node (e.g. E-SMLC), MDT, etc. It should be noted that the network node 110 may be have a single antenna or multiple antennas, i.e. more than one antenna, in order to support Single User MIMO, SU-MIMO, or Multi-User MIMO, MU-MIMO, transmissions.

In FIG. 5, a wireless device 121 is located within the cell 115. The wireless device 121 is configured to communicate within the wireless communications network 100 via the network node 110 over a radio link served by the network node 110. The wireless device 121 may refer to any type of wireless device or user equipment (UE) communicating with a network node and/or with another wireless device in a cellular, mobile or radio communication network or system. Examples of such wireless devices are mobile phones, cellular phones, Personal Digital Assistants (PDAs), smart phones, tablets, sensors equipped with a UE, Laptop Mounted Equipment (LME) (e.g. USB), Laptop Embedded Equipments (LEEs), Machine Type Communication (MTC) devices, or Machine to Machine (M2M) device, Customer Premises Equipment (CPE), target device, device-to-device (D2D) wireless device, wireless device capable of machine to machine (M2M) communication, etc. It should be noted that the wireless device 121 may be have a single antenna or multiple antennas, i.e. more than one antenna, in order to support Single User MIMO, SU-MIMO, or Multi-User MIMO, MU-MIMO, transmissions.

Furthermore, although embodiments below are described with reference to FIG. 5, this should not be construed as limiting to the embodiments herein, but merely as an example made for illustrative purposes. It should be noted that in the following, both the network node 110 and the wireless device 121 are referred to a node in the wireless communications network 100, since the embodiments described herein may be performed for both uplink transmissions, as well as, downlink transmissions.

As part of the developing of the embodiments described herein, it has been realized that the embodiments described herein, besides enhancing channel estimation by more easily being able to separate different channel estimates and data and mitigate pilot signal contamination, is further advantageous in that the pre-equalization or "flattening" only have a minor impact on the Peak-to-Average Power Ratio, PAPR, value of the transmissions. Typically, channel pre-equalization at the transmitter suffers from inefficient power allocation. The reason is that, due to frequency selectivity, there may be deep fades which need a lot of power to be compensated for across the whole carrier. However, since the pre-equalization or "flattening" is performed only locally, or in a piecewise-manner, the compensation or alignment is also only performed locally. This means that the transmitter is less likely to experience such deep fades and that the transmit power of the transmitter is better utilized. This aspect is further discussed in reference to FIGS. 11-12 below.

Another advantage of the embodiments described herein is that the local or piece-wise pre-equalization or "flattening" does not require strict channel reciprocity between the DL and UL. It only requires that similar relative phase and amplitude changes occur between the DL and UL subcarriers, i.e. DL/UL REs.

Furthermore, it should also be noted that the performance of the multi-user transmissions described by the embodiments herein is not limited due to narrowband transmission or non-contiguous PRB allocation. In fact, a further advantage of the embodiments described herein is that the local or piece-wise pre-equalization or "flattening" may assist in implementing non-contiguous PRB allocation for multi-user transmissions, which will enhance the performance of the wireless communications network by introducing frequency diversity. On the contrary, conventional MU-MIMO solutions may require contiguous PRB allocation in order to facilitate advanced channel estimation.

Embodiments of the node 121, 110, i.e. the network node 110 and/or the wireless device 121, and a method therein will be described in more detail below with reference to FIGS. 6-15.

Figure 6:
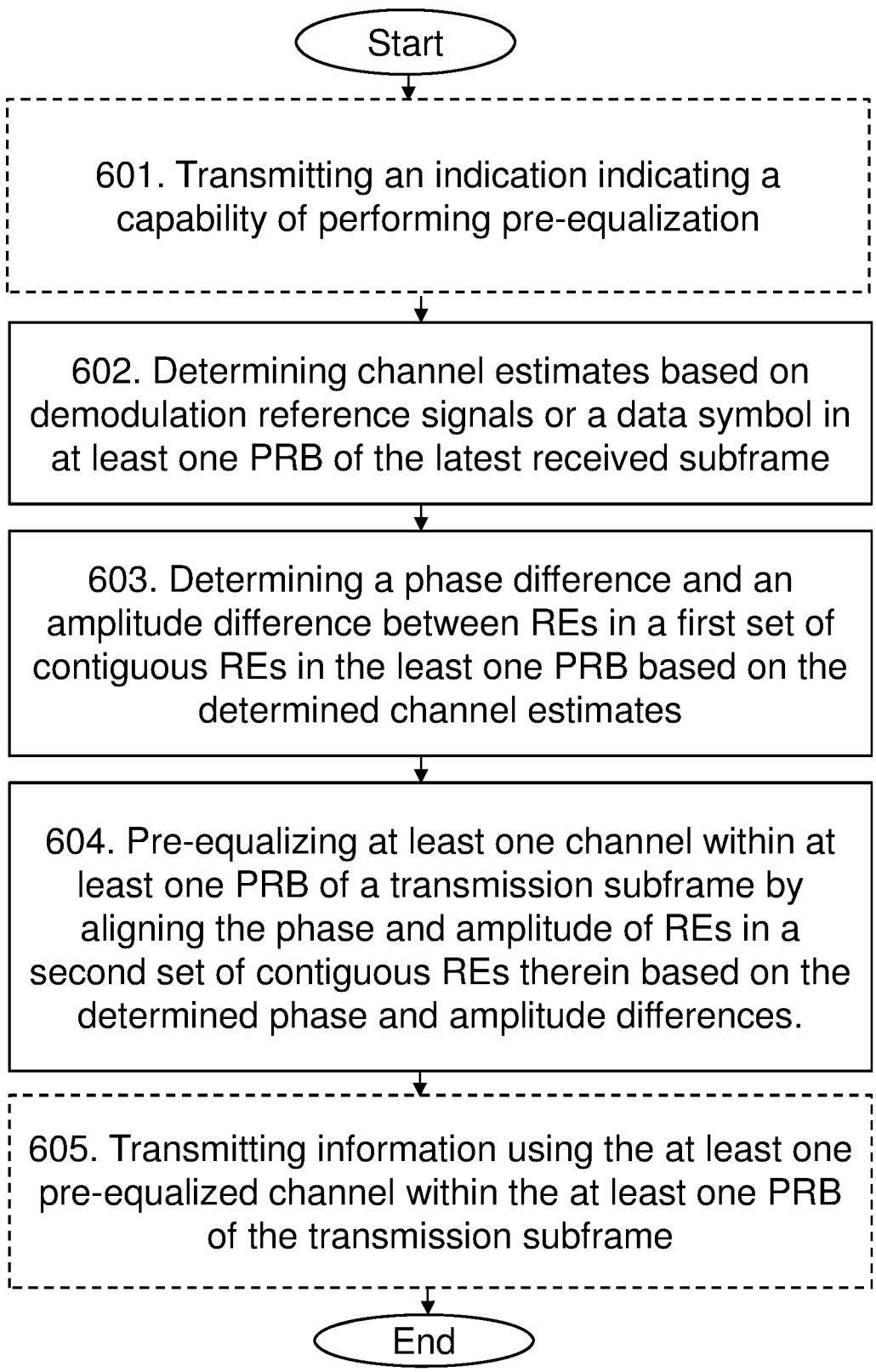
FIG. 6 is a flowchart depicting embodiments of a method in a node.

Example of embodiments of a method performed by a node 110, 121 for improving multi-user transmissions in the wireless communications network 100 will now be described with reference to the flowchart depicted in FIG. 6. FIG. 6 is an illustrated example of actions or operations which may be taken by a node 110, 121 in the wireless communication network 100. According to one example, the method may be implemented for a node 110, 121 operating in a Time-Division Duplex, TDD, mode for Uplink, UL, and Downlink, DL, transmissions, wherein the UL and DL transmissions occur on at least partly the same frequency resources, e.g. are scheduled or conducted on the same PRBs or occupy the same bandwidth. The latter is true for UL/DL transmissions in TDD mode in both LTE and NR. The method may comprise the following actions.

Action 601

Optionally, the node 110, 121 may first transmits an indication to another node 121, 110 in the wireless communications network 100 indicating that the node 121, 110 is capable of performing the pre-equalizing, or "flattening", described in Action 604 below. This means, for example, that the receiving node, i.e. the other node 121, 110 e.g. a network node or wireless device, is informed of the fact that the node 110, 121 is capable of performing the pre-equalizing. This is advantageous in that the receiving node 121, 110 may take this into account when performing the scheduling of its transmissions to the node 110, 121. For example, the receiving node 121, 110 may take in account channel variations between PRBs, i.e. intra-PRB channel variations, when making scheduling decisions.

Action 602

The node 110, 121 determines channel estimates based on demodulation reference signals, or a data symbol in at least one Physical Resource Block, PRB, of the latest received subframe. This means that the node 110, 121 may determine the channel estimates, i.e. the angle and amplitude of the channel. This may also be referred to as determining the channel coefficients of the REs.

To exemplify this further, in case the node 110, 121 is a wireless device 121, then the wireless device 121 may determine the channel estimate of the DL channel, i.e. the angle and amplitude of the DL channel. Similarly, in case the node 110, 121 is a network node, then the network node 110 may determine the channel estimate of the UL channel, i.e. the angle and amplitude of the UL channel. In some embodiments, the demodulation reference signal may be the latest Demodulation Reference Signal, DMRS, or other similar reference signals used for demodulation. In some embodiments, the data symbol in the at least one PRB may be the last OFDM data symbol in the at least on PRB of the latest received subframe. However, it should be noted that other data symbols, such as, e.g. the second last OFDM data symbol or others, may also be used.

Action 603

After determining the channels estimates in Action 602, the node 110, 121 determines a phase difference and an amplitude difference between Resource Elements, REs, in a first set of contiguous REs in the at least one PRB of the latest received subframe based on the obtained channel estimates. This means that the node 110, 121 may, from the determined channels estimates, determine phase and amplitude differences between consecutive REs in the first set of contiguous REs. The first set of contiguous REs may also be referred to a first set of neighbouring REs. The first set of contiguous REs may also be referred to a first set of contiguous or neighbouring subcarriers.

Action 604

After determining the phase and amplitude differences in Action 603, the node 110, 121 pre-equalizes at least one channel within at least one PRB of a transmission subframe by aligning the phase and amplitude of REs in a second set of contiguous REs therein based on the determined phase and amplitude differences. In other words, the node 110, 121 may use the determined phase and amplitude differences in the latest received subframe to equalize or "flatten" a channel locally. Equalizing or "flattening" a channel locally here means that the phase and amplitude of REs in a second set of contiguous REs of the transmission subframe are aligned according to the determined phase and amplitude differences. According to one example, the second set of contiguous REs may span one or two contiguous PRBs. However, in case the channel has low delay spread, then the local channel pre-equalization may also be performed for up to 4 or 8 contiguous PRBs. In some embodiments, the network node 110, may receive information indicating how many contiguous PRBs that the local pre-equalization or "flattening" spans. This means that the node 110, 121 may piece-wise, i.e. in at least one PRB, pre-equalize the demodulation reference signals and data symbols of a transmission subframe prior to transmission. It should be noted that the transmission subframe may be an UL subframe in case the node 110, 121 is a wireless device, or a DL subframe in case the node 110, is a network node. Further, the term pre-equalize or pre-equalization is used herein to denoted that the equalization or "flattening" is performed prior to transmitting the transmission subframe.

It should be noted that while the channel is here pre-equalized or "flattened" locally in order to mitigate the pilot signal contamination at a receiver end, the purpose is not to completely cancel out the channel fading across the REs or subcarriers, but rather to render the channel locally "flat" within the span of typically one or two PRBs.

In some embodiments, the node 110, 121 may select one RE in the second set of contiguous REs within the at least one PRB of the transmission subframe to be a reference in respect to which the phase and amplitude of the REs in the second set of contiguous REs are to be aligned. In this case, the node 110, 121 may thus align the phase and amplitude of the REs in the second set of contiguous REs further based on the phase and amplitude of the selected reference. This means that the node 110, 121 may select a RE or subcarrier within the second set of contiguous REs in the at least one PRB in the transmission subframe, and use that as reference for the alignment according to the phase and amplitude differences determined in Action 603. The reference may also be referred to as a reference channel or reference point. The node 110, 121 may then compensate the rest of the REs within the second set of contiguous REs in the at least one PRB in the transmission subframe by aligning the phase and amplitude of the rest of the REs within the second set of contiguous REs in at least one PRB in view of the selected reference. This may be performed such that the channel in the at least one PRB in the transmission subframe is nearly "flat" and is similar to the angle and gain of the reference or reference, i.e. the channel of the selected RE within the second set of contiguous REs in at least one PRB in the latest received subframe. This is explained in more detail in reference to FIGS. 7-14 below.

In some embodiments, the node 110, 121 may determine a reference value of the phase and amplitude for the second set of contiguous REs within the at least one PRB of the transmission subframe in respect to which the phase and amplitude of the REs in the second set of contiguous REs are to be aligned. In this case, the node 110, 121 may thus align the phase and amplitude of the REs in the second set of contiguous REs further based on the determined reference values of the phase and amplitude. This means that the node 110, 121 may, for example, use a function of the RE channels within the first set of contiguous REs in the at least one PRB in the latest received subframe in order to determine reference values for a phase and amplitude. The node 110, 121 may then use those reference values as a reference for the pre-equalization. This means that the node 110, 121 may then compensate all REs within the second set of contiguous REs in the at least one PRB of the transmission subframe by aligning the phase and amplitude of all the REs within the second set of contiguous REs in at least one PRB of the transmission subframe with the phase and amplitude of the determined reference, i.e. according to the determined reference values for the phase and amplitude. This may be performed such that the channel in the at least one PRB is nearly "flat" and is similar to the angle and gain of the reference. This is also explained in more detail in reference to FIGS. 7-14 below.

It should also be noted that the wordings "nearly flat" or "similar to" used above are used to described how the channel of the at least one PRB is made sufficiently close to flat in order to be treated as such. According to a simple example, in case RE k is used as the reference, then a channel consisting of two REs k and l is perfectly flat if the phase $\varphi(k)$ and amplitude $\rho(k)$ of a first RE k is equal to the phase $\varphi(l)$ and amplitude $\rho(l)$ of the second RE l. According to some embodiments, sufficiently close to flat may be interpreted for the phase as $|\varphi(k)-\varphi(l)|<a$, wherein a may be between 0.05 and 0.1 degrees; that is, the channel phase difference between reference and another RE is negligible. For flat channel, this difference is zero. According to some embodiments, sufficiently close to flat may be interpreted for the amplitude as $0.99<\rho(k)/\rho(l)<1.01$; that is, the channel amplitudes are approximately the same. For a flat channel, they are equal and the ratio is exactly 1. It should be noted that other suitable values may be selected in the relations presented above when designing the wireless communications network 100 and that these are merely illustrative examples.

In some embodiments, the node 110, 121 may determine the reference value of the phase and amplitude for the second set of contiguous REs within the at least one PRB by, for example, determining a mean or median value of the phase and amplitude based on the REs in the second set of contiguous REs. Alternatively, the median or mean value may be used together with an offset value in order to achieve the pre-equalization.

In some embodiments, the node 110, 121 may pre-equalize a first channel within the at least one PRB of the transmission subframe by aligning the phase and amplitude of a first subset of contiguous REs in the second set of contiguous REs based on the determined phase and amplitude differences. Here, the node 110, 121 may also pre-equalize a second channel within the at least one PRB of the transmission subframe by aligning the phase and amplitude of a second subset of contiguous REs in the second set of contiguous REs based on the determined phase and amplitude differences. This means that the node 110, 121 may split the second set of contiguous REs in the at least one PRB into different sub-sets or sub-blocks in order to perform the pre-equalization separately for each channel within each sub-set or sub-block. This may be performed in order to support fewer transmissions, while further simplifying the pre-equalization and increasing power efficiency. This is further explained in more detail in reference to FIGS. 7-14 below.

Action 605

Optionally, after the pre-equalization in Action 604, the node 110, 121 may transmit information using the at least one pre-equalized channel within the at least one PRB of the transmission subframe. This means, for example, that another node 121, 110, e.g. a network node or wireless device, may receive the demodulation reference signals and data symbols in the transmission subframe, which overlaps with other the demodulations reference signals and data symbols of other transmission subframes in the wireless communications network 100, and be able to more easily and correctly separate the different transmissions due to the pre-equalized or "flattened" channels therein. For example, in case the other node 121, 110 is a network node 110, then the network node 110 may receive such transmitted subframes in multi-user transmissions from different wireless devices, and may thus more easily separate the different wireless devices and their channel estimates and data. Hence, the network node 121 will be able to mitigate the pilot signal contamination and enhance the channel estimation for the multi-user transmissions received from the different wireless devices.

More detailed embodiments of the node 121, 110, i.e. the network node 110 and/or the wireless device 121, and the method therein will now be described in even further detail below with reference to the example illustrated in FIGS. 7-12.

Figure 7:
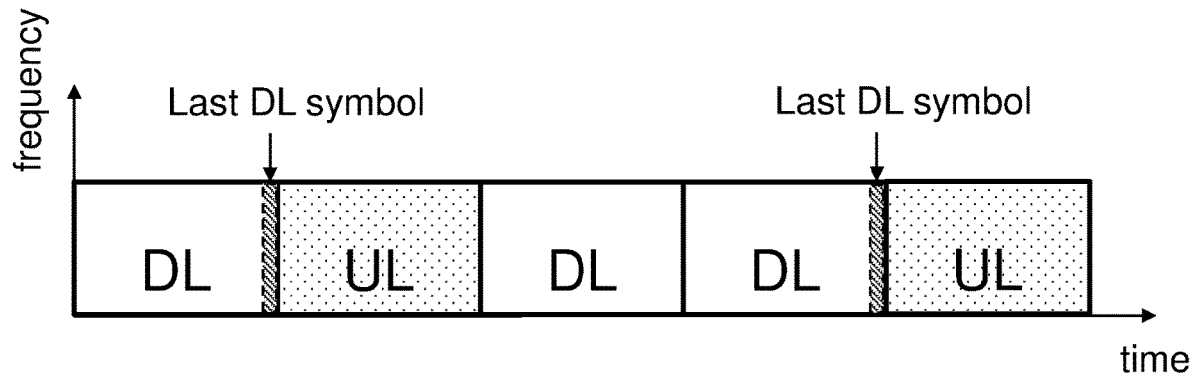
FIG. 7 is a schematic block diagram illustrating UL/DL PRBs in TDD mode according to some embodiments.

FIG. 7 shows a schematic block diagram illustrating UL/DL PRBs in TDD mode wherein the UL/DL transmissions occupy the same bandwidth. The TDD mode may also be dynamic TDD.

In the example shown in FIG. 7, the node 110, 121 is assumed to be a wireless device 121 receiving DL subframes and transmitting UL subframes to a receiving node. The wireless device 121 may here be a single antenna wireless device, although the example is equally applicable to multi-antenna wireless device. The receiving node may, for example, be a network node 110, such as, for example, a multi-antenna gNB.

In the example shown in FIG. 7, it is illustrated how the last data symbol or last OFDM data symbol of a DL PRB, i.e. the dashed regions in FIG. 7, may be used by the wireless device 121 for estimating a channel, i.e. determining channel estimates. These channel estimates may then be used by the wireless device 121 to perform pre-equalization and "flatten" channels in a subsequent UL PRB, i.e. the dotted areas in FIG. 7.

It should also be noted here that one PRB is assumed in this example, yet the same principle may be applied to each PRB of a Physical Resource Group, PRG. This example is furthermore applicable in both MU-MIMO, as well as, in Non-Orthogonal Multiple Access, NOMA. NOMA is similar to MU-MIMO with an added pre-processing step, where the wireless devices are spreading their symbols in frequency using short spreading vectors that span 4 or 6 REs.

Figure 8:
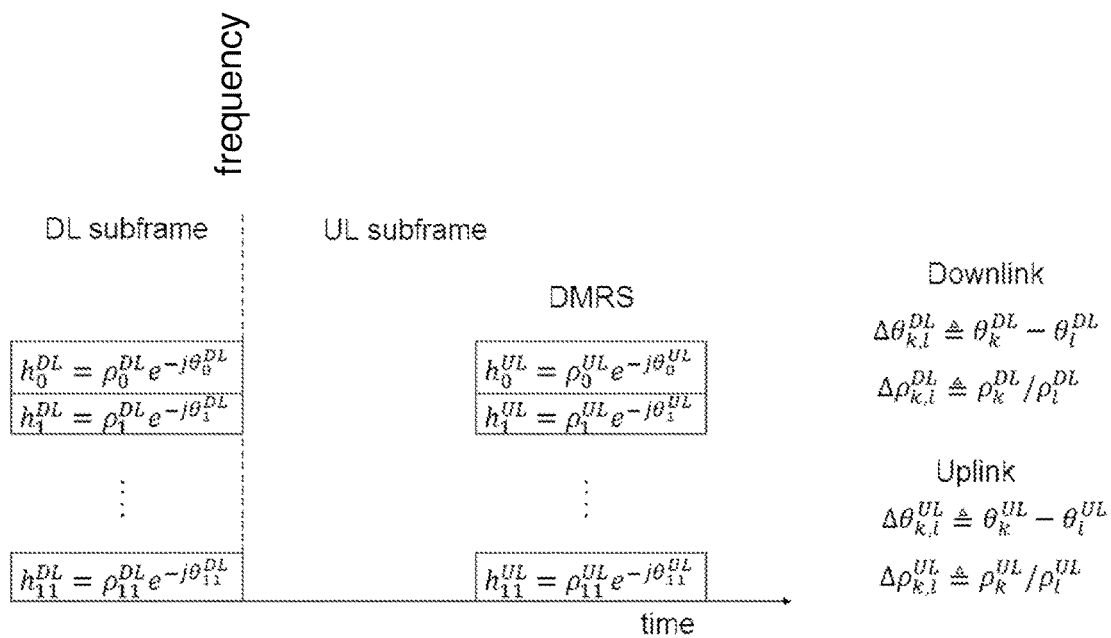
FIG. 8 is a schematic block diagram illustrating DL channel estimation for use in pre-equalization of UL channels according to some embodiments.

FIG. 8 is a schematic block diagram illustrating in more detail how DL channel estimation is used for pre-equalization of UL channels according to some embodiments.

First, the wireless device 121 may estimate the channel and determine the channel estimates, $h_k$, based on the latest received DL subframe, e.g. based on the DMRS or the last received OFDM symbol in the latest received DL subframe. Based on the channel estimates, $h_k$, a phase difference, $\Delta\theta_{k,l}$, and an amplitude difference, $\Delta\rho_{k,l}$, between the REs k and l in a first set of contiguous REs, i.e. between the neighbouring subcarriers k and l, in the latest received DL subframe may be determined as illustrated in FIG. 8.

It should be noted that determining the exact DL channel is not necessary here, but rather the phase difference and the amplitude difference between the neighbouring REs or subcarriers in the latest received DL subframe. This is because the phase difference and the amplitude difference between the neighbouring REs or subcarriers may be assumed to remain constant for a number of subsequent subframes even if the channel changes. Hence, the following relations in Eq. 1-2 may be assumed:

$$\Delta\rho_{k,l}^{DL}=\Delta\rho_{k,l}^{UL} \qquad (Eq. 1)$$

$$\Delta\theta_{k,l}^{DL}=\Delta\theta_{k,l}^{UL} \qquad (Eq. 2)$$

This means that the phase difference, $\Delta\theta_{k,l}$, and the amplitude difference, $\Delta\rho_{k,l}$, between neighbouring subcarriers, i.e. between the REs in a second set of contiguous REs, in a subsequent UL subframe may be assumed by the wireless device 121 to also be same as the phase difference, $\Delta\theta_{k,l}$, and the amplitude difference, $\Delta\rho_{k,l}$, between neighbouring subcarriers, i.e. between the REs in the first set of contiguous REs, in the latest received DL subframe. It should also be noted that for a scenario with low-delay spread or low Doppler, the assumption according to Eq. 1-2 is very realistic because even the channel is quasi-static.

Figure 9:
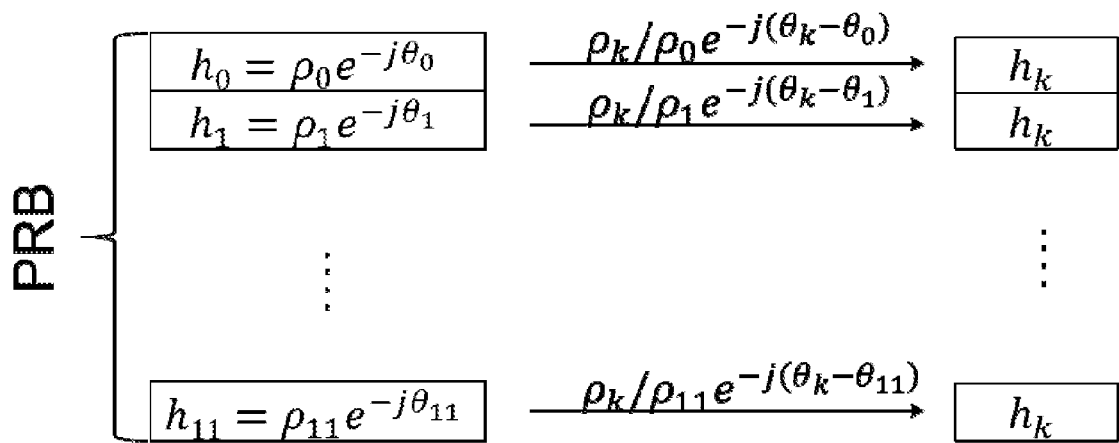
FIG. 9 is a schematic block diagram illustrating pre-equalization of UL channels according to some embodiments.

FIG. 9 is a schematic block diagram illustrating general example of pre-equalization of UL channels in a single PRB according to some embodiments. In this example, it is assumed that the demodulation reference signals, such as, the DMRS in the subsequent UL subframe shown in FIG. 8, may be self-contained on a single PRB-basis. This means that the wireless device 121 is able to determine the channel estimates for each individual PRB without having to combine DMRS sequences from multiple PRBs.

According to some embodiments, the wireless device 121 may select one subcarrier among the neighbouring subcarriers, i.e. select one RE in the second set of contiguous REs, within a PRB of the UL subframe to be a reference channel in respect to which the phase and amplitude of the REs in the second set of contiguous REs are to be aligned. Then, the wireless device 121 may align the phase and amplitude of the REs in the second set of contiguous REs based on the phase and amplitude of the selected reference channel.

In a more generalized example of this embodiment in reference to FIG. 9, the wireless device 121 may be indexed as the j:th wireless device. In this case, the j:th wireless device may select an RE with index $k\in\{0,\ldots,11\}$, whose channel $h_k^j$ is going to be the selected reference channel. The purpose here for the j:th wireless device is to make the UL channels $h_m^j$, $m\neq k$ within the PRB look like or be similar to $h_k^j=\rho_k^j e^{-j\theta_k^j}$. This may be achieved by the j:th wireless device by compensating for the amplitude and phase difference between $h_k^j$ and $h_m^j$, $m\neq k$, which will provide the pre-equalized channels, $\tilde{h}_m^j$. The pre-equalized channels, $\tilde{h}_m^j$, may be determined in accordance with Eq. 3:

$$\tilde{h}_m^j \triangleq h_m^j \Delta\rho_{k,m}^j e^{-j\Delta\theta_{k,m}^j} \qquad (Eq. 3)$$

wherein $$\Delta\rho_{k,m}^j \triangleq \rho_k^j/\rho_m^j$$

$$\Delta\theta_{k,m}^j \triangleq \theta_k^j-\theta_m^j$$

are the pre-equalizing coefficients for the phase and amplitude differences. The pre-equalizing coefficients for the phase and amplitude are determined based on the channel estimates of the latest received DL subframe and may be assumed to correspond to the actual the phase and amplitude differences in the UL.

By selecting these pre-equalizing coefficients and aligning the phase and amplitude accordingly for the neighbouring subcarriers, i.e. the REs in the second set of contiguous REs, in the PRB in the subsequent UL subframe, the channel within the PRB in the subsequent UL subframe, i.e. the intra-PRB channel, is left virtually flat in accordance with Eq. 4:

$$\tilde{h}_m^j=h_k^j \forall m\in\{0,\ldots,11\} \qquad (Eq. 4)$$

This process is also illustrated in FIG. 9.

It should here be noted that, as previously described, this is only one example of how to pre-equalize or "flatten" the channel within the PRB in the subsequent UL subframe. Another example may comprise using a reference value, such as, a mean amplitude $\bar{\rho}^j \triangleq 1/12 \Sigma_k \rho_k^j$ and mean phase $\bar{\theta}^j \triangleq 1/12\Sigma_k\theta_k^j$ of the neighbouring subcarriers, i.e. the REs in the second set of contiguous REs, within the PRB in the subsequent UL subframe. Here, it should be noted that the denominator corresponds to and is equal to the number of REs or subcarriers in the set of contiguous REs; in this example, there are 12 REs in the set of contiguous REs since only one PRB is considered. Another example may comprise using a median value, or using a mean/median value together with an offset value. According to some aspects, this may advantageously be more efficient in terms of power. However, when it comes to the phase, any value may be used as reference, since it does not require power compensation.

Figure 10:
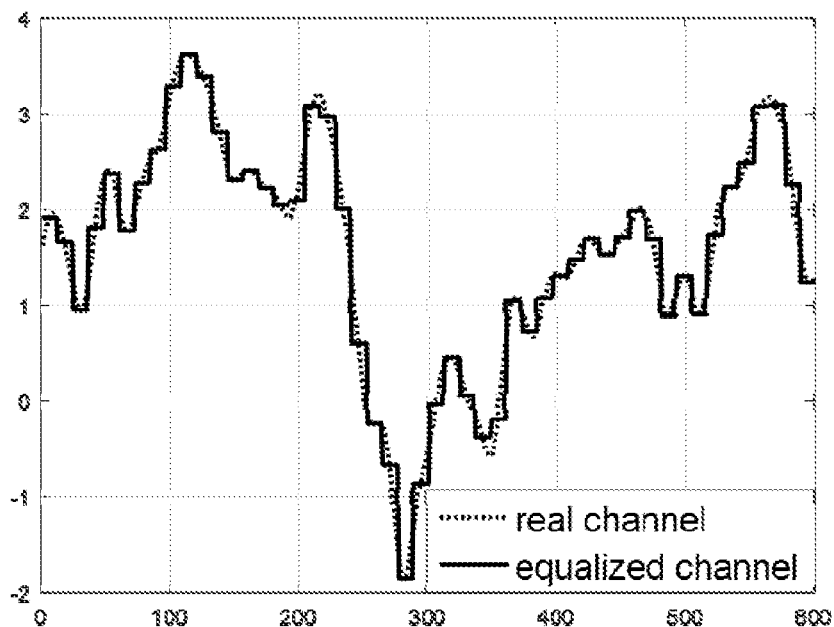
FIG. 10 is a diagram illustrating the power of a pre-equalized UL channel according to some embodiments as compared to the original channel power.

FIG. 10 is a diagram illustrating the power of a pre-equalized UL channel according to some embodiments as compared to the original channel power. It should here be noted that the purpose is not to completely cancel out the fading coefficients $\rho_m^j$ and phase rotation $\theta_m^j$. Instead, we only want to "flatten" the channel within the PRB. This is illustrated in FIG. 10 wherein the power of a locally pre-equalized or "flattened" channel is compared to the power of the original channel power, i.e. real channel.

Figure 11:
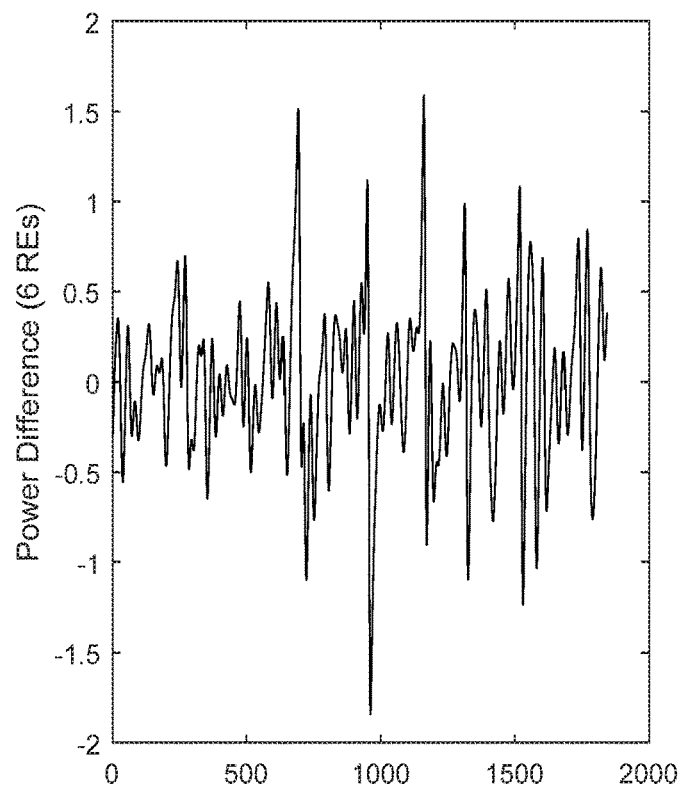
FIG. 11 is a diagram illustrating a relative power difference according to some embodiments.
Figure 12:
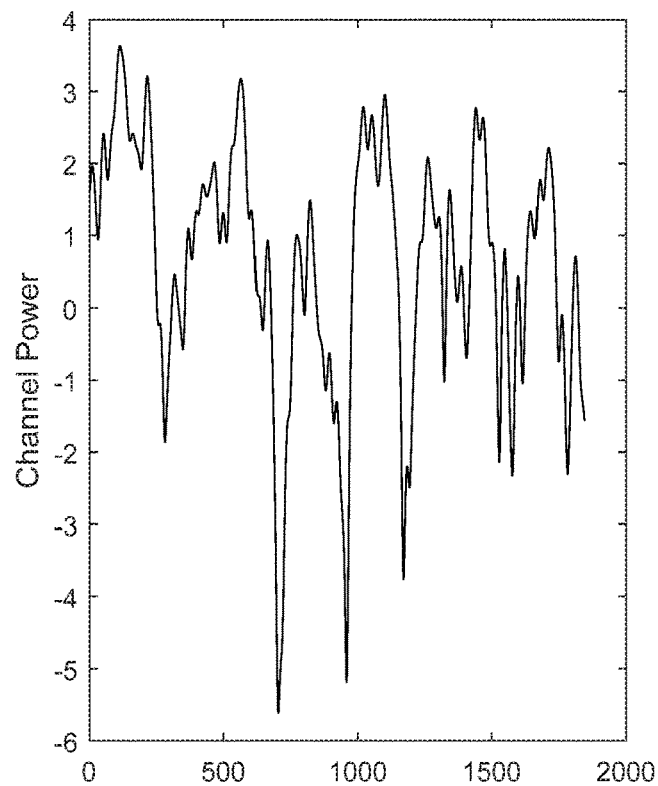
FIG. 12 is another diagram illustrating a relative power difference according to some embodiments.

FIG. 11 is a diagram illustrating an example of a relative power difference between subcarriers (or REs) in a PRB being spaced six indices apart, and FIG. 12 is a diagram illustrating an example of the absolute channel power for all subcarriers. FIGS. 11-12 illustrates an advantage of using the pre-equalization according to the embodiments herein, since due the local channel equalization that is performed prior to transmitting the UL subframe severe power variations are less likely to be encountered.

In FIG. 11, the power difference between subcarriers or REs that are six indices apart are expressed in DB. In other words, FIG. 11 shows the power difference as the quantity expressed in Eq. 5:

$$10 \log_{10} \rho_k^j - 10 \log_{10} \rho_{k+6}^j \quad \text{(Eq. 5)}$$

In this case, it may be observed that the absolute value of the maximum power difference is only 1.5 dB. On the contrary, in FIG. 12, the absolute channel power for all subcarriers is also expressed in decibels (dB). and it shows that the gap between the maximum and minimum absolute power value is approximately 10 dB. This means that he local pre-equalization or "flattening" according to the embodiments herein may, in the worst case, require 1.5 dB, whereas a wider power equalization, e.g. equalization over all subcarriers, may, in the worst case, require approximately 10 dB. It may therefore be inferred that local channel pre-equalization according to the embodiments described herein, e.g. over a single or two PRBs, is much more efficient as compared to a wider power equalization for the UL channel.

In view of this aspect, it should be noted that the node 110, 121 may according to some embodiments perform scheduling that considers and takes into account channel variations and thus schedules DL and UL transmissions over PRBs where the power of the channel varies less, i.e. schedules DL and UL transmissions over PRBs wherein pre-equalization is most efficient.

According to a further illustrative and simplified example, assume that the amplitude changes between neighbouring subcarriers, i.e. REs in a first set of contiguous REs, in a PRB in the latest received DL subframe by a relatively low, constant value, $\Delta\rho$. The constant value, $\Delta\rho$, may then be determined by, for example, a j:th wireless device, from the channel estimates of the PRB in the latest received DL subframe. The constant value, $\Delta\rho$, may be assumed to be constant in time for at least a few OFDM symbols. In this case, a first subcarrier or RE amplitude in a PRB of a subsequent UL subframe may be expressed as $\rho_0^j = \bar{\rho}_0$ for a j:th wireless device for a value $\bar{\rho}_0$. The rest of the subcarriers or REs in the PRB of the subsequent UL subframe may thus be expressed according to Eq. 6:

$$\rho_m^j = \bar{\rho}_0 + m\Delta\rho \quad \text{(Eq. 6)}$$

wherein m>1 is the subcarrier or RE index.

If the reference amplitude is $\rho_0^j$, i.e. the amplitude of the first subcarrier or RE is selected as a reference channel for the PRB of the subsequent UL subframe, then the equalized amplitude of the other subcarriers or REs may be expressed according to Eq. 7:

$$\tilde{\rho}_m^j \triangleq \rho_m^j - m\Delta\rho, \forall m \in \{1, \ldots, 11\} \quad \text{(Eq. 7)}$$

To equalize the amplitude for the channel in the PRB in this way, the total power units spent is thus equal to $(1+2+ \ldots +11)\Delta\rho = 66\Delta\rho$.

However, in case the reference amplitude is instead selected to be the seventh ($7^{th}$) subcarrier or RE in the PRB, i.e. $\rho_7^j = \bar{\rho}_0 + 6\Delta\rho$, then the equalized amplitude of the other subcarriers or REs may be expressed according to Eqs. 8-9:

$$\tilde{\rho}_m^j \triangleq \rho_m^j + (6-m)\Delta\rho, \forall m \{0,1, \ldots, 5\} \quad \text{(Eq. 8)}$$

$$\tilde{\rho}_m^j \triangleq \rho_m^j - (m-6)\Delta\rho, \forall m \{7, \ldots, 11\} \quad \text{(Eq. 9)}$$

In this case, to equalize the amplitude for the channel in the PRB, the total power units spent is $2(1+2+ \ldots +5)\Delta\rho + 6\Delta\rho = 36\Delta\rho$. This is almost half of the power that is spent in comparison to the previous case. It should be noted that here the equalization is indicated by subtraction/addition, whereas in previous examples it was shown by using division. This operation is used here only for the purpose of illustration, since a division (as well as a multiplication) operation may be equivalently be carried out by one or more subtractions/additions. Of course, as mentioned above in some embodiments, an average amplitude, e.g. in the form of a mean or median value, over the subcarriers or REs in the PRB of the subsequent UL subframe may also be used as the reference value.

Figure 13:
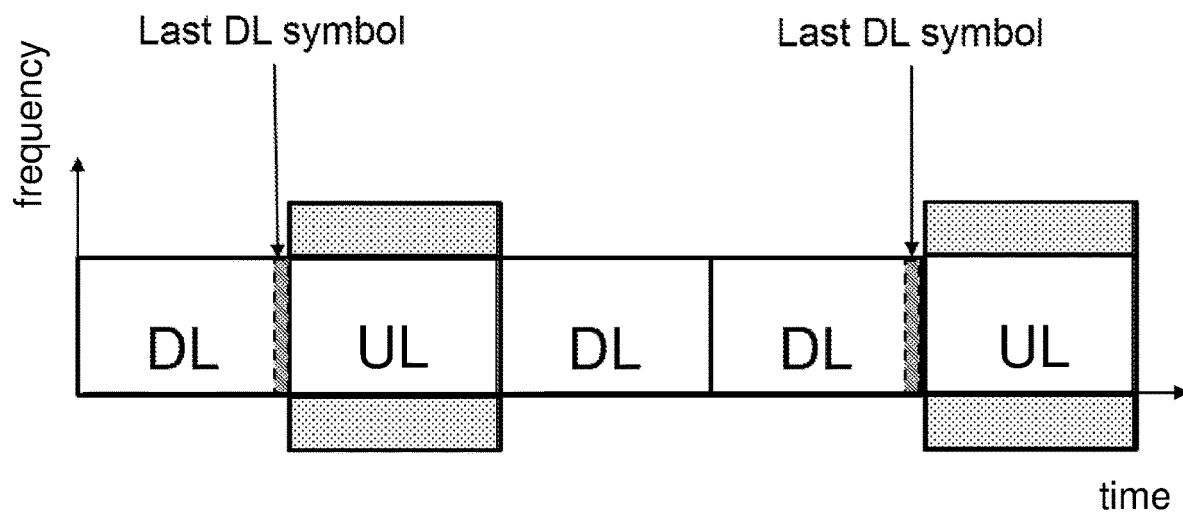
FIG. 13 is another schematic block diagram illustrating pre-equalization of UL channels for asymmetric transmissions according to some embodiments.
Figure 14:
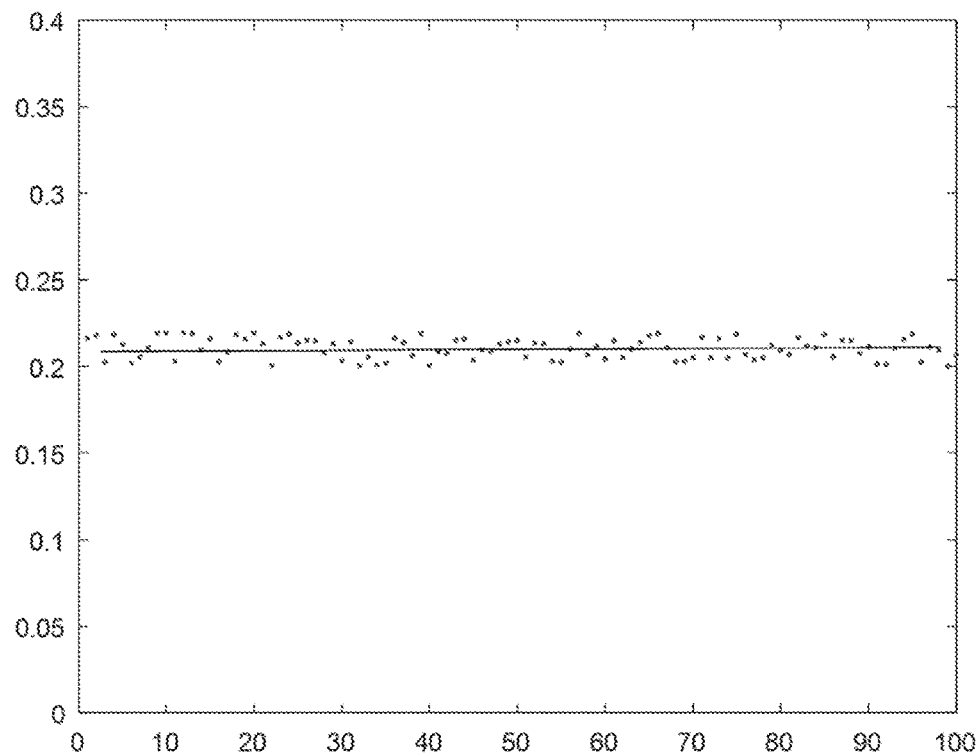
FIG. 14 is another diagram illustrating pre-equalization of UL channels for asymmetric transmissions according to some embodiments.

FIGS. 13-14 shows a schematic block diagram and a diagram illustrating pre-equalization of UL channels for asymmetric transmissions according to some embodiments. This may be advantageous in a wireless communications network based on NR, since it is currently being discussed to use asymmetric transmissions therein. In this case, asymmetric transmissions means that the bandwidth of the UL subframes will be wider than the bandwidth of the DL subframes. An advantage of using asymmetric transmissions for the DL/UL transmissions is that a wireless device 121 is not required to monitor the complete bandwidth, but only a fraction of the bandwidth. This means that the wireless device 121 may save battery power, while still be able to receive information, such as, e.g. control signaling and Modulation and Coding Scheme, MCS, to be used for UL transmissions.

In this case, according some embodiments, the amplitude and phase differences determined by a wireless device 121 based on the channel estimates obtained from the latest received DL subframe with narrower bandwidth may be extrapolated to cover also bandwidth outside of the narrower bandwidth of the DL subframe. In FIG. 13, the parts of the UL subframe that are outside of the narrower bandwidth of the DL subframe are shown by the dotted areas. This may be particularly useful for channels that have low delay spread or low Doppler, i.e. channel that are not particularly frequency selective. For example, if the phase differences between neighboring subcarrier or REs in the PRB are almost constant with small deviations, e.g. a mean value of the phase differences $\Delta\varphi$ is $0.02*\pi$ radians, then these phases differences may be re-used for pre-equalizing the parts of the UL subframe that are outside of the narrower bandwidth of the DL subframe. This may similarly be performed for the amplitude differences in a similar way.

According to some embodiments, the wireless device 121 may also determine a trend for the amplitude and phase differences determined based on the channel estimates obtained from the latest received DL subframe with narrower bandwidth. For example, the wireless device 121 may determine that the amplitude differences, $\Delta\rho$, between neighboring subcarriers or REs are increasing and thus determine a function which extrapolates this trend for the parts of the UL subframe that are outside of the narrower bandwidth of the DL subframe. This function may then be used for pre-equalizing the parts of the UL subframe that are outside of the narrower bandwidth of the DL subframe. According to one example, the function may be determined as a linear function, such as, e.g. $\Delta\rho(1,2)=\mu$, $\Delta\rho(2,3)=\mu+c$, $\Delta\rho(3,4)=\mu+2c$, etc., wherein the parentheses represent subcarrier or RE indices.

FIG. 14 show another example according to some embodiments herein, wherein a linear function or line is fitted to a set of determined phase and/or amplitude differences. This linear functions or line is then used to extrapolate and determine phase and/or amplitude differences for the parts of the UL subframe that are outside of the narrower bandwidth of the DL subframe. These extrapolated phase and/or amplitude differences may then be used for pre-equalizing the parts of the UL subframe that are outside of the narrower bandwidth of the DL subframe. The linear function or line may be fitted to the set of determined phase and/or amplitude differences using, for example, machine learning techniques, such as, e.g. linear regression.

One advantage of the pre-equalization according to the embodiments described herein is that it makes the channel with the single or two PRBs more predictable for a receiver in the wireless communications network 100. This allows for simplifications of the receiver and increases the amount of available processing resources due to more simplified algorithms.

A first aspect of the embodiments described herein is that the pre-equalization may be performed when having a UL-MIMO/NOMA channel estimation. For example, in the case of UL-MIMO, many PRBs will be allocated to co-scheduled wireless devices 121. If the wireless devices 121 perform pre-equalization per a single or two contiguous PRBs, then the network node 110 does not need to determine weights for each and every subcarrier. Instead, the network node 110 may determine weights per single or two contiguous PRBs, since the channels within the single or two contiguous PRBs will not change. Additionally, the channel estimation may be performed more rarely than before, such as, for example, one time per PRB in this case.

To exemplify this, assume that the network node 110 is configured to support twelve (12) wireless devices, such as, the wireless devices 121. The channel of j:th wireless device 121 may be expressed as Eq. 10, and the unit-norm orthogonal sequences of the DMRS used by each of the j:th wireless device may be expressed by Eq. 11:

$$h^j \triangleq [(h_0^j)^H, \ldots, (h_{11}^j)^H]^H \quad \text{(Eq. 10)}$$

$$s^j \triangleq [(s_0^j)^H, \ldots, (s_{11}^j)^H]^H \quad \text{(Eq. 11)}$$

such that $(s^j)^H s^k = 0$ for $j \neq k$. The orthogonal sequences of the DMRS is here assumed to span all 12 REs in a PRB.

Without pre-equalization according to the embodiments described herein, the network node 110 will determine the channel based on the DMRS symbols as described in Eq. 12:

$$y = \Sigma_j h^j \odot s^j + n \quad \text{(Eq. 12)}$$

where the symbol $\odot$ denotes point-wise multiplication of the vectors $h^j$ and $s^j$. However, in case pre-equalization is performed according to the embodiments described herein, using for example the seventh (7:th) subcarrier or RE channel $h_6^j$ in the PRB as the reference according to Eq. 13:

$$\tilde{h}^j = [1, \ldots, 1]^T h_6^j \quad \text{(Eq. 13)}$$

then the reference becomes the effective channel and the network node 110 will determine the channel based on the DMRS symbols as described in Eq. 14:

$$\tilde{y} = \Sigma_j \tilde{h}^j \odot s^j + n = \Sigma_j s^j h_6^j + n \quad \text{(Eq. 14)}$$

Since the effective channel of k:th wireless device is flat, it may be recovered by the network node 110 from the received signal $\hat{y}$ as described in Eq. 15:

$$\hat{h}_6^k = (s^k)^H \tilde{y} = (s^k)^H (\Sigma_j \tilde{h}^j \odot s^j + n) = h_6^k + (s^k)^H n \quad \text{(Eq. 15)}$$

If the channel was not flattened, then the network node 110 would require advanced channel estimation in order to obtain all the elements of the channel according to Eq. 16:

$$\{h_m^j\}_{m=0}^{11} \quad \text{(Eq. 16)}$$

In this case, there would also be a significant residual interference, since an increased number of wireless devices results in an increased contamination of the pilot signals.

It should also be noted that the channel has approximately the same power when performing the pre-equalization as when the pre-equalization is not performed, since the channel elements $\{h_m^j\}_{m=0}^{11}$ have approximately the same power within the PRB, as shown above with reference to FIGS. 11-12. This is because the pre-equalization is performed locally within a single or two PRBs, which has a limited impact on the power of the channel. Since the channel power does not vary significantly for neighbouring subcarriers, i.e. the REs in the second set of contiguous REs, in the single or two contiguous PRBs in the subsequent UL subframe, a negligible power is needed for the compensation or alignment operation.

According to some embodiments, a single PRB may also be split into parts or sub-blocks, wherein a channel may be equalized within each sub-block. This may be to support fewer wireless devices. For example, a single PRB may be split in 3 parts for 4 wireless devices (e.g. subcarriers 0-3, 4-7, 8-11) or 2 parts for 6 wireless devices (e.g. subcarriers 0-5, 6-11). This advantageously makes the pre-equalization even easier and power-efficient.

A second aspect of the embodiments described herein is that the pre-equalization may be performed in an MTC type of communication. For example, assume that the channels within a PRB of a subsequent UL subframe are pre-equalized or "flattened" as described in the examples of the embodiments above.

The time-domain received signal at the network node 110 will be the superposition of transmissions from wireless devices, wherein each transmission has a form that may be described as in Eq. 17:

$$r_u(k) = s_u(k)\rho_u e^{-jk\theta_u} \quad \text{(Eq. 17)}$$

wherein the subscript is the index of the wireless device, and k is the subcarrier or RE index. In case, for the sake of simplicity, only two (2) wireless devices are assumed, then the total received signal at the network node 110 may be described according to Eq. 18:

$$r(k) = r_1(k) + r_2(k) + w(k) = \rho_1 s_1(k) e^{-jk\theta_1} + \rho_2 s_2(k) e^{-jk\theta_2} + w(k), \quad \text{(Eq. 18)}$$

wherein $s_1(k), s_2(k)$ are the pilot signals of each wireless device. In this case, the network node 110 may then correlate the received signal with the spreading sequence of a first wireless device in accordance with Eq. 19:

$$m_1(k) = r(k)s_1(k)^* = \rho_1 |s_1(k)|^2 e^{-jk\theta_1} + \rho_2 s_2(k)s_1(k)^* e^{-jk\theta_2} + w(k)s_1(k)^* \quad \text{(Eq. 19)}$$

Then, the network node 110 may perform a Power Delay Profile, PDF, based on the correlated signal, $m_1(k)$, using a Fast Fourier Transform, FFT. After that, the network node 110 may detect the first wireless device using a power threshold. Thus, the network node 110 may by trying out all the spreading sequences eventually detect which wireless devices that have been transmitting in the during the receiving Transmission Time Interval, TTI, namely, the wireless devices with the pilot signals $s_1, s_2$.

For channel estimation, if the correlation between wireless devices is low, such as, the pilot signal sequences being either orthogonal or having a low correlation, then $m_1(k)$ may be used as input to classical algorithms. For example, the network node 110 may use a coherent average algorithm over the allocated bandwidth (e.g. 1 PRB here at the taps may correspond to the peaks of the PDF in the detection phase). According to another example, the network node 110 may use a MAP algorithm that is based on belief propagation. In a further example, the network node 110 may use a ML decoder algorithm to try different discretized hypotheses on the amplitude and phases of the involved wireless devices. In this case, if the network node 110 may assume that the wireless devices are capable of tracking the TTI clock of the network node 110 and that the timing offset between UL and DL sub-frames is fixed and known to both the wireless devices and the network node 110, then the network node 110 may further reduce the number of hypotheses. This is because, in this case, the phase of each channel of each wireless device for which a transmission is received the network node 110 may be made deterministic. This means that the phase could be set to $\theta_1$ by the network node 110 for all wireless devices by using it as the reference value for the phase. Thus, only the spreading sequence and the spatial separation would suffice to differentiate the wireless devices.

It should also be noted that the pre-equalization according to the embodiments described herein may be applied to DL MU-MIMO to improve the performance of the wireless device 121, or to Single-User MIMO, SU-MIMO, to improve the performance of the wireless device 121. Also, the pre-equalization according to the embodiments described herein may be applied to improve UL-MIMO/NOMA reception in a network node 110 of different streams originating from different wireless devices having different locations.

Figure 15:
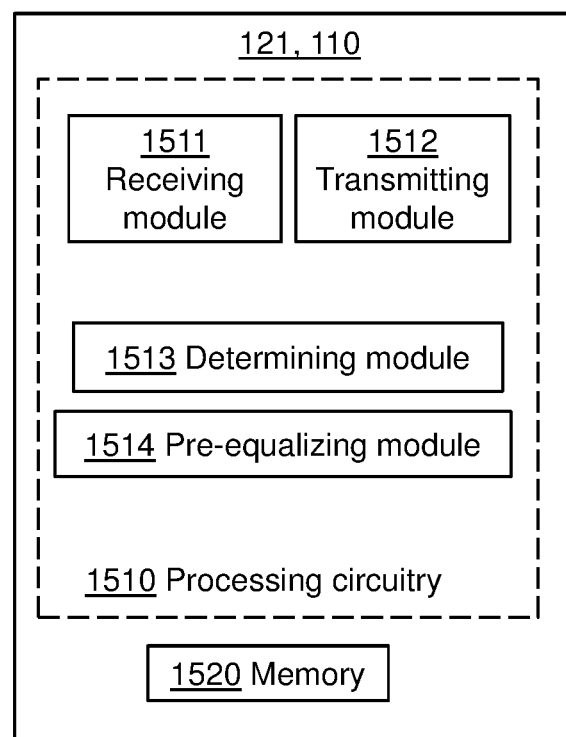
FIG. 15 is a block diagram depicting embodiments of a node.

To perform the method actions in the node 110, 121 for improving multi-user transmissions in a wireless communications network 100, the node 110, 121 may comprise the following arrangement depicted in FIG. 15. FIG. 15 shows a schematic block diagram of embodiments of a node 110, 121. The embodiments of the node 110, 121 described herein may be considered as independent embodiments or may be considered in any combination with each other to describe non-limiting examples of the example embodiments described herein.

The node 110, 121 may comprise processing circuitry 1510, a memory and at least one antenna (not shown). The processing circuitry 1510 may also comprise a receiving module 1511 and a transmitting module 1512. The receiving module 1511 and the transmitting module 1512 may comprise Radio Frequency, RF, circuitry and baseband processing circuitry capable of transmitting a radio signal in the wireless communications network 100. The receiving module and the transmitting module 1512 may also form part of a single transceiver. It should also be noted that some or all of the functionality described in the embodiments above as being performed by the node 110, 121 may be provided by the processing circuitry 1510 executing instructions stored on a computer-readable medium, such as, e.g. the memory 1520 shown in FIG. 15. Alternative embodiments of the node 110, 121 may comprise additional components, such as, for example, a determining module 1513 and an pre-equalization module 1514, each responsible for providing its respective functionality necessary to support the embodiments described herein.

The node 110, 121 or processing circuitry 1510 is configured to, or may comprise the determining module 513 configured to, determine channel estimates based on demodulation reference signals, or a data symbol in at least one PRB, of the latest received subframe. Also, the node 110, 121 or processing circuitry 1510 is configured to, or may comprise the determining module 514 configured to, determine a phase difference and an amplitude difference between REs in a first set of contiguous REs in the at least one PRB of the latest received subframe based on the obtained channel estimates. Further, the node 110, 121 or processing circuitry 1510 is configured to, or may comprise the determining module 514 configured to, pre-equalize at least one channel within at least one PRB of a transmission subframe by aligning the phase and amplitude of REs in a second set of contiguous REs therein based on the determined phase and amplitude differences.

In some embodiments, the node 110, 121 or processing circuitry 1510 may be configured to, or may comprise the transmitting module 1512 configured to, transmit information using the at least one pre-equalized channel within the at least one PRB of the transmission subframe. In some embodiments, the node 110, 121 or processing circuitry 1510 may be configured to, or may comprise the transmitting module 1512 configured to, transmit an indication to another node 110, 121 in the wireless communications network 100 indicating that the node 121, 110 is capable of performing the pre-equalization.

In some embodiments, the node 110, 121 or processing circuitry 1510 may be configured to, or may comprise the pre-equalization module 1514 configured to, select one RE in the second set of contiguous REs within the at least one PRB of the transmission subframe to be a reference in respect to which the phase and amplitude of the REs in the second set of contiguous REs are to be aligned. In this case, the node 110, 121 or processing circuitry 1510 may also be further configured to, or the pre-equalization module 1514 may further be configured to, align the phase and amplitude of the REs in the second set of contiguous REs based on the phase and amplitude of the selected reference.

In some embodiments, the node 110, 121 or processing circuitry 1510 may be configured to, or may comprise the pre-equalization module 1514 configured to, determine a reference value of the phase and amplitude for the second set of contiguous REs within the at least one PRB of the transmission subframe in respect to which the phase and amplitude of the REs in the second set of contiguous REs are to be aligned. In this case, the node 110, 121 or processing circuitry 1510 may also be further configured to, or the pre-equalization module may further be configured to, align the phase and amplitude of the REs in the second set of contiguous REs further based on the determined reference values of the phase and amplitude.

In some embodiments, the node 110, 121 or processing circuitry 1510 may be configured to, or may comprise the pre-equalization module 1514 configured to, pre-equalize a first channel within the at least one PRB of the transmission subframe by aligning the phase and amplitude of a first subset of contiguous REs in the second set of contiguous REs based on the determined phase and amplitude differences, and pre-equalize a second channel within the at least one PRB of the transmission subframe by aligning the phase and amplitude of a second subset of contiguous REs in the second set of contiguous REs further based on the determined phase and amplitude differences.

Furthermore, the embodiments for improving multi-user transmissions in a wireless communications network 100 described above may be implemented through one or more processors, such as the processing circuitry 1510 in the node 110, 121 depicted in FIG. 15, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1510 in the node 110, 121. The computer program code may e.g. be provided as pure program code in the node 110, 121 or on a server and downloaded to the node 110, 121. Thus, it should be noted that the modules of the node 110, 121 may in some embodiments be implemented as computer programs stored in memory, e.g. in the memory modules 1520 in FIG. 15, for execution by processors or processing modules, e.g. the processing circuitry 1510 of FIG. 15.

Those skilled in the art will also appreciate that the processing circuitry and the memory 1520 described above may refer to a combination of analog and digital circuits, and/or one or more processors configured with software and/or firmware, e.g. stored in a memory, that when executed by the one or more processors such as the processing circuitry 1520 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

ADDITIONAL ASPECTS

According to a first additional aspect of the embodiments described herein, it is also presented a method implemented in a communication system including a host computer, a base station and a user equipment (UE), the method comprising: at the host computer, receiving user data transmitted to the base station from the UE, wherein the UE determines channel estimates based on demodulation reference signals, or a data symbol in at least one Physical Resource Block, PRB, of the latest received subframe, determines a phase difference and an amplitude difference between Resource Elements, REs, in a first set of contiguous REs in the at least one PRB of the latest received subframe based on the obtained channel estimates, and pre-equalizes at least one channel within at least one PRB of a transmission subframe by aligning the phase and amplitude of REs in a second set of contiguous REs therein based on the determined phase and amplitude differences. The method may further comprise: at the UE, providing the user data to the base station. The method may further comprise: at the UE, executing a client application, thereby providing the user data to be transmitted; and at the host computer, executing a host application associated with the client application. The method may further comprise: at the UE, executing a client application; and at the UE, receiving input data to the client application, the input data being provided at the host computer by executing a host application associated with the client application, wherein the user data to be transmitted is provided by the client application in response to the input data.

According to a second additional aspect of the embodiments described herein, it is also presented a method implemented in a communication system including a host computer, a base station and a user equipment (UE), the method comprising: at the host computer, providing user data; and at the host computer, initiating a transmission carrying the user data to the UE via a cellular network comprising the base station, wherein the base station determines channel estimates based on demodulation reference signals, or a data symbol in at least one Physical Resource Block, PRB, of the latest received subframe, determines a phase difference and an amplitude difference between Resource Elements, REs, in a first set of contiguous REs in the at least one PRB of the latest received subframe based on the obtained channel estimates, and pre-equalizes at least one channel within at least one PRB of a transmission subframe by aligning the phase and amplitude of REs in a second set of contiguous REs therein based on the determined phase and amplitude differences. The method may further comprise: at the base station, transmitting the user data. A method as described above, wherein the user data is provided at the host computer by executing a host application, and the method further comprises: at the UE, executing a client application associated with the host application, may also be provided.

According to a third additional aspect of the embodiments described herein, it is also presented a communication system including a host computer comprising: a communication interface configured to receive user data originating from a transmission from a user equipment (UE) to a base station, wherein the UE comprises a radio interface and processing circuitry, the UE's processing circuitry configured to: determine channel estimates based on demodulation reference signals, or a data symbol in at least one Physical Resource Block, PRB, of the latest received subframe, determine a phase difference and an amplitude difference between Resource Elements, REs, in a first set of contiguous REs in the at least one PRB of the latest received subframe based on the obtained channel estimates, and pre-equalize at least one channel within at least one PRB of a transmission subframe by aligning the phase and amplitude of REs in a second set of contiguous REs therein based on the determined phase and amplitude differences. The communication system may further include the UE. The communication system may further include the base station, wherein the base station comprises a radio interface configured to communicate with the UE and a communication interface configured to forward to the host computer the user data carried by a transmission from the UE to the base station. A communication system described above, wherein: the processing circuitry of the host computer is configured to execute a host application; and the UE's processing circuitry is configured to execute a client application associated with the host application, thereby providing the user data may also be provided. A communication system described above, wherein: the processing circuitry of the host computer is configured to execute a host application, thereby providing request data; and the UE's processing circuitry is configured to execute a client application associated with the host application, thereby providing the user data in response to the request data may also be provided.

According to a fourth additional aspect of the embodiments described herein, it is also presented a communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to determine channel estimates based on demodulation reference signals, or a data symbol in at least one Physical Resource Block, PRB, of the latest received subframe, determine a phase difference and an amplitude difference between Resource Elements, REs, in a first set of contiguous REs in the at least one PRB of the latest received subframe based on the obtained channel estimates, and pre-equalize at least one channel within at least one PRB of a transmission subframe by aligning the phase and amplitude of REs in a second set of contiguous REs therein based on the determined phase and amplitude differences. The communication system may further include the base station. The communication system may further include the UE, wherein the UE is configured to communicate with the base station. A communication system described above, wherein: the processing circuitry of the host computer is configured to execute a host application, thereby providing the user data; and the UE comprises processing circuitry configured to execute a client application associated with the host application may also be provided.

Figure 16:
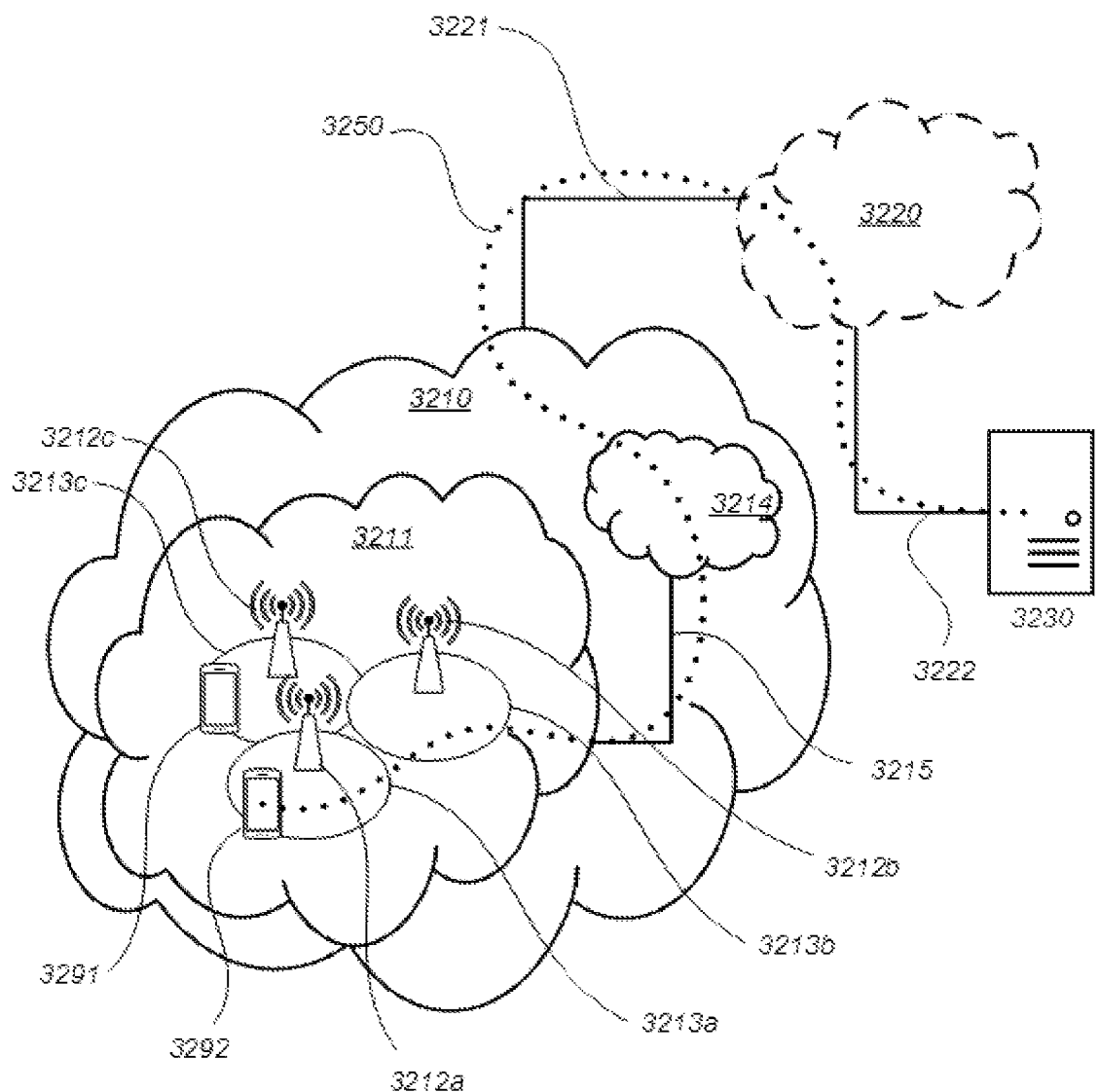
FIG. 16 schematically illustrates a telecommunication network connected via an intermediate network to a host computer.

With reference to FIG. 16, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 16 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 17. In a communication system 3300, a host computer 3310 comprises hardware 3315 including a communication interface configured to set up and maintain a wired or wireless connection with an interface of a different communication device of the communication system 3300. The host computer 3310 further comprises processing circuitry 3318, which may have storage and/or processing capabilities. In particular, the processing circuitry may comprise one or more programmable processors, application-specific integrated circuits, field programmable gate arrays or combinations of these (not shown) adapted to execute instructions. The host computer 3310 further comprises software 3311, which is stored in or accessible by the host computer and executable by the processing circuitry

3318. The software 3311 includes a host application 3312. The host application 3312 may be operable to provide a service to a remote user, such as a UE 3330 connecting via an OTT connection terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 17) served by the base station 3320. The communication interface 3326 may be configured to facilitate a connection 3360 to the host computer 3310. The connection 3360 may be direct or it may pass through a core network (not shown in FIG. 17) of the telecommunication system and/or through one or more intermediate networks outside the telecommunication system. In the embodiment shown, the hardware of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application may receive request data from the host application 3312 and provide user data in response to the request data. The OTT connection 3350 may transfer both the request data and the user data. The client application 3332 may interact with the user to generate the user data that it provides.

Figure 17:
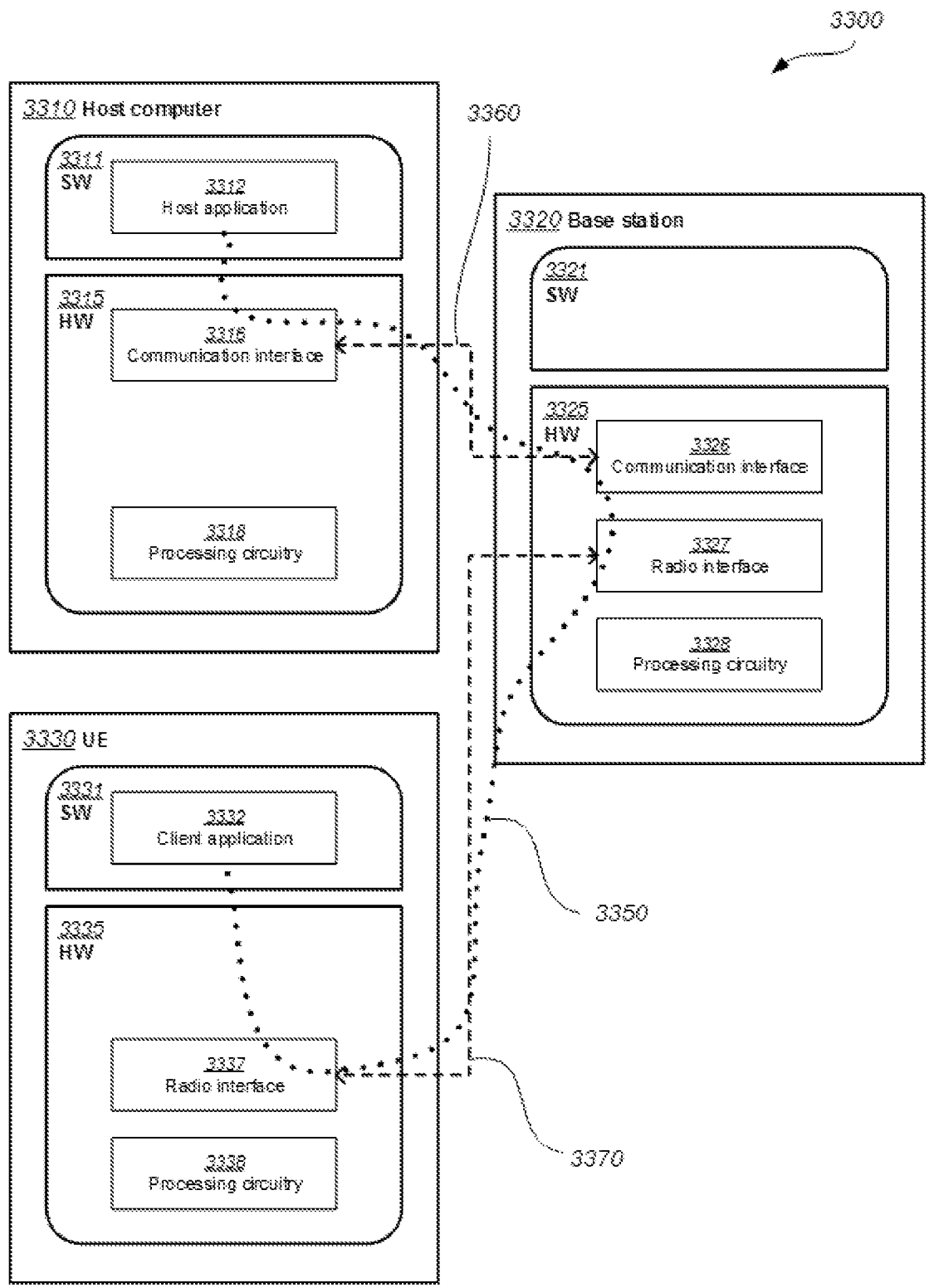
FIG. 17 is a generalized block diagram of a host computer communicating via a base station with a user equipment over a partially wireless connection.

It is noted that the host computer 3310, base station 3320 and UE 3330 illustrated in FIG. 17 may be identical to the host computer 3230, one of the base stations 3212*a*, 3212*b*, 3212*c* and one of the UEs 3291, 3292 of FIG. 16, respectively. This is to say, the inner workings of these entities may be as shown in FIG. 17 and independently, the surrounding network topology may be that of FIG. 16.

In FIG. 17, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the ability to more easily being able to separate different channel estimates and data and mitigate pilot signal contamination, and thereby provide benefits such as enhancing channel estimation.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 18:
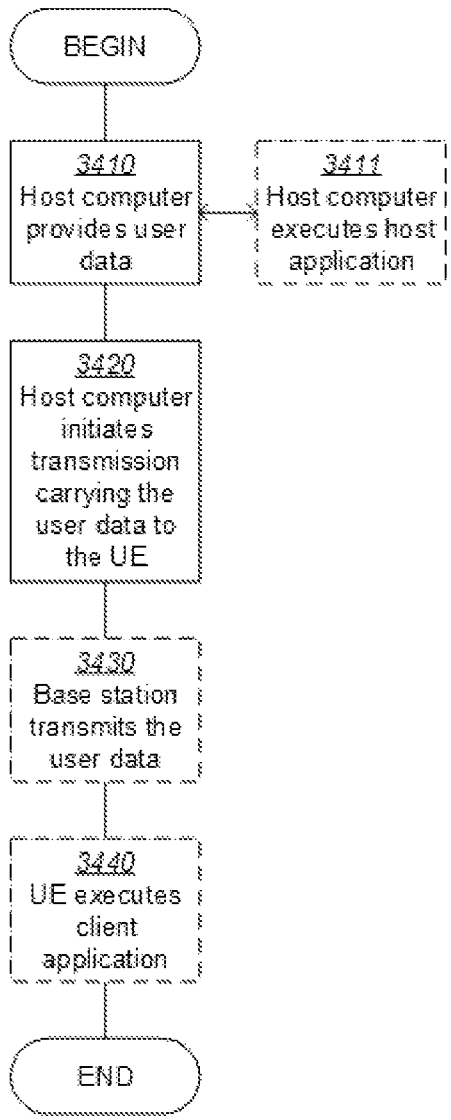
FIGS. 18-19 are flowcharts illustrating methods implemented in a communication system including a host computer, a base station and a user equipment.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 19:
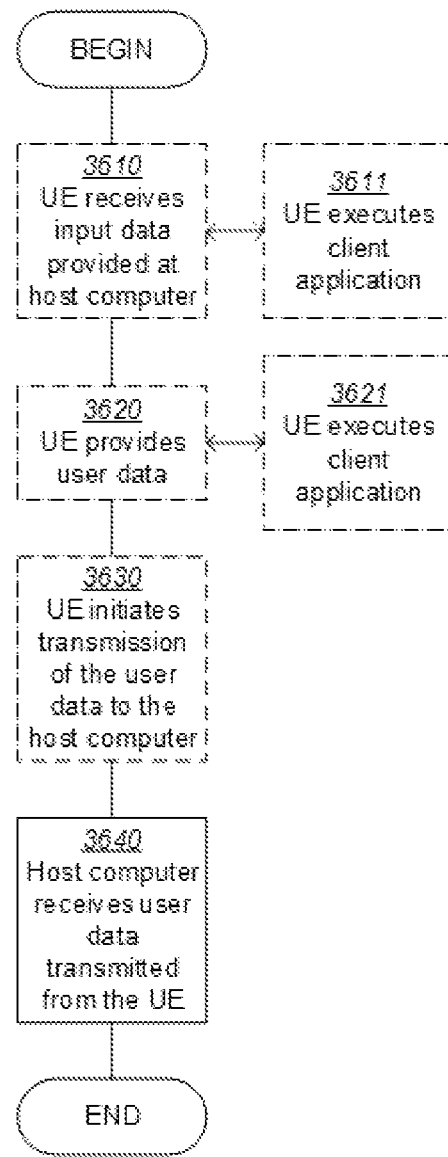

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In an optional first step 3610 of the method, the UE receives input data provided by the host computer.

Additionally, or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Abbreviations

CE Channel estimation
FFT Frequency Fourier Transform
DMRS Demodulation Reference Signal
LTE Long-Term Evolution
MIMO Multiple Input Multiple Output
MU-MIMO Multi-user MIMO
NOMA Non-orthogonal multiple access
PDF Power Delay Profile
PRB Physical Resource Block
PRG Physical Resource Group
NR New Radio
TTI Transmit Time Interval
UE User Equipment
PAPR Peak-to-Average Power Ratio

The invention claimed is:

1. A method performed by a node in a wireless communications network for multi-user transmissions in the wireless communications network, the method comprising:
determining channel estimates based on one of demodulation reference signals and a data symbol in at least one Physical Resource Block, PRB, of the latest received subframe; and
determining a phase difference and an amplitude difference between Resource Elements, REs, in a first set of contiguous REs in the at least one PRB of the latest received subframe based on the determined channel estimates; and
pre-equalizing at least one channel within at least one PRB of a transmission subframe by aligning a phase and an amplitude of REs in a second set of contiguous REs therein based on the determined phase and amplitude differences.

2. The method according to claim 1, further comprising transmitting information using the at least one pre-equalized channel within the at least one PRB of the transmission subframe.

3. The method according to claim 1, wherein the pre-equalizing further comprises:
selecting one RE in the second set of contiguous REs within the at least one PRB of the transmission subframe to be a reference in respect to which the phase and the amplitude of the REs in the second set of contiguous REs are to be aligned; and
aligning the phase and the amplitude of the REs in the second set of contiguous REs further based on a phase and an amplitude of the selected RE.

4. The method according to claim 1, wherein the pre-equalizing further comprises:
determining reference values of the phase and the amplitude for the second set of contiguous REs within the at least one PRB of the transmission subframe in respect to which the phase and the amplitude of the REs in the second set of contiguous REs are to be aligned; and
aligning the phase and the amplitude of the REs in the second set of contiguous REs further based on the determined reference values of the phase and the amplitude.

5. The method according to claim 1, wherein the pre-equalizing further comprises:
pre-equalizing a first channel within the at least one PRB of the transmission subframe by aligning a phase and an amplitude of a first subset of contiguous REs in the second set of contiguous REs based on the determined phase and amplitude differences; and
pre-equalizing a second channel within the at least one PRB of the transmission subframe by aligning a phase and an amplitude of a second subset of contiguous REs in the second set of contiguous REs based on the determined phase and amplitude differences.

6. The method according to claim 1, further comprising transmitting an indication to another node in the wireless communications network indicating that the node is capable of performing the pre-equalizing.

7. The method according to claim 1, wherein the node is one of a wireless device and a network node.

8. The method according to claim 2, wherein the pre-equalizing further comprises:
selecting one RE in the second set of contiguous REs within the at least one PRB of the transmission subframe to be a reference in respect to which the phase and the amplitude of the REs in the second set of contiguous REs are to be aligned; and
aligning the phase and the amplitude of the REs in the second set of contiguous REs further based on a phase and an amplitude of the selected RE.

9. The method according to claim 8, wherein the pre-equalizing further comprises:
pre-equalizing a first channel within the at least one PRB of the transmission subframe by aligning a phase and an amplitude of a first subset of contiguous REs in the second set of contiguous REs based on the determined phase and amplitude differences; and
pre-equalizing a second channel within the at least one PRB of the transmission subframe by aligning a phase and an amplitude of a second subset of contiguous REs in the second set of contiguous REs based on the determined phase and amplitude differences.

10. The method according to claim 2, wherein the pre-equalizing further comprises:
determining reference values of the phase and the amplitude for the second set of contiguous REs within the at least one PRB of the transmission subframe in respect to which the phase and the amplitude of the REs in the second set of contiguous REs are to be aligned; and aligning the phase and the amplitude of the REs in the second set of contiguous REs further based on the determined reference values of the phase and the amplitude.

11. The method according to claim 2, wherein the pre-equalizing further comprises:

pre-equalizing a first channel within the at least one PRB of the transmission subframe by aligning a phase and an amplitude of a first subset of contiguous REs in the second set of contiguous REs based on the determined phase and amplitude differences; and pre-equalizing a second channel within the at least one PRB of the transmission subframe by aligning a phase and an amplitude of a second subset of contiguous REs in the second set of contiguous REs based on the determined phase and amplitude differences.

12. The method according to claim 2, further comprising transmitting an indication to another node in the wireless communications network indicating that the node is capable of performing the pre-equalizing.

13. A node in a wireless communications network for multi-user transmissions in the wireless communications network, the node comprising a processor and a memory, the memory containing instructions executable by the processor to configure the network node to:

determine channel estimates based on one of demodulation reference signals and a data symbol in at least one Physical Resource Block, PRB, of the latest received subframe;

determine a phase difference and an amplitude difference between Resource Elements, REs, in a first set of contiguous REs in the at least one PRB of the latest received subframe based on the determined channel estimates; and pre-equalize at least one channel within at least one PRB of a transmission subframe by aligning a phase and an amplitude of REs in a second set of contiguous REs therein based on the determined phase and amplitude differences.

14. The node according to claim 13, further configured to transmit information using the at least one pre-equalized channel within the at least one PRB of the transmission subframe.

15. The node according to claim 13, further configured to:

select one RE in the second set of contiguous REs within the at least one PRB of the transmission subframe to be a reference in respect to which the phase and the amplitude of the REs in the second set of contiguous REs are to be aligned; and align the phase and the amplitude of the REs in the second set of contiguous REs based on a phase and an amplitude of the selected RE.

16. The node according to claim 13, further configured to:

determine reference values of the phase and amplitude for the second set of contiguous REs within the at least one PRB of the transmission subframe in respect to which the phase and the amplitude of the REs in the second set of contiguous REs are to be aligned and align the phase and the amplitude of the REs in the second set of contiguous REs further based on the determined reference values of the phase and the amplitude.

17. The node according to claim 13, further configured to:

pre-equalize a first channel within the at least one PRB of the transmission subframe by aligning a phase and an amplitude of a first subset of contiguous REs in the second set of contiguous REs based on the determined phase and amplitude differences; and pre-equalize a second channel within the at least one PRB of the transmission subframe by aligning a phase and an amplitude of a second subset of contiguous REs in the second set of contiguous REs further based on the determined phase and amplitude differences.

18. The node according to claim 13, further configured to transmit an indication to another node in the wireless communications network indicating that the node is capable of performing the pre-equalization.

19. The node according to claim 13, wherein the node is one of a wireless device and a network node.

20. A non-transitory computer storage medium storing an executable computer program, comprising instructions which, when executed on at least one processor, causes the at least one processor to perform a method comprising:

determining channel estimates based on one of demodulation reference signals and a data symbol in at least one Physical Resource Block, PRB, of the latest received subframe; and determining a phase difference and an amplitude difference between Resource Elements, REs, in a first set of contiguous REs in the at least one PRB of the latest received subframe based on the determined channel estimates; and pre-equalizing at least one channel within at least one PRB of a transmission subframe by aligning a phase and an amplitude of REs in a second set of contiguous REs therein based on the determined phase and amplitude differences.

* * * * *